US012701605B2

(12) United States Patent     (10) Patent No.:   US 12,701,605 B2

Huang                   (45) Date of Patent:       Aug. 4, 2026

(54) METHODS AND DEVICES FOR RANDOM ACCESS IN WIRELESS LOCAL AREA NETWORKS

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 300 days.

(21) Appl. No.: 18/530,717

(22) Filed: Dec. 6, 2023

(65) Prior Publication Data

US 2024/0114546 A1     Apr. 4, 2024

Related U.S. Application Data

(63) Continuation of application No. PCT/CN2022/097685, filed on Jun. 8, 2022.

(30) Foreign Application Priority Data

Jun. 8, 2021    (SG) .......................... 10202106096W

(51) Int. Cl.
   *H04W 74/00*       (2009.01)
   *H04W 74/0833*     (2024.01)
           (Continued)

(52) U.S. Cl.
   CPC ..... *H04W 74/002* (2013.01); *H04W 74/0833* (2013.01); *H04L 41/0681* (2013.01); *H04W 84/12* (2013.01)

(58) Field of Classification Search
   CPC . H04W 74/00; H04W 74/002; H04W 74/006; H04W 74/08;
           (Continued)

(56) References Cited

U.S. PATENT DOCUMENTS

| | | | | |
|---|---|---|---|---|
| 10,880,924 | B2 * | 12/2020 | Ahn | ....................... H04W 84/12 |
| 2017/0289994 | A1 | 10/2017 | Kim | |

(Continued)

FOREIGN PATENT DOCUMENTS

| | | | | |
|---|---|---|---|---|
| BR | 122025001217 | A2 * | 4/2025 | ............... H04L 1/00 |
| BR | 122025001341 | A2 * | 4/2025 | ............... H04L 1/00 |

(Continued)

OTHER PUBLICATIONS

International Search Report in the international application No. PCT/CN2022/097685, mailed on Sep. 7, 2022, 3 pages.

(Continued)

*Primary Examiner* — Warner Wong

(74) *Attorney, Agent, or Firm* — BAYES PLLC

(57)            ABSTRACT

Disclosed are methods and devices for random access in a WLAN. The method carried out by an access point (AP) comprises: setting, by the AP, a User Info field in a Trigger frame to allocate one or more resource units (RUs) or multiple resource units (MRUs) in a trigger-based (TB) physical layer protocol data unit (PPDU) for uplink orthogonal frequency division multiple access based random access (UORA) for associated stations (STAs) or unassociated STAs, wherein an association identifier (AID)12 subfield of the User Info field is set to a first value if the one or more RUs or MRUs are allocated for UORA for the associated STAs, or a second value different from the first value if the one or more RUs or MRUs are allocated for UORA for the unassociated STAs, and sending, by the AP, the Trigger frame to the associated STAs and/or the unassociated STAs.

18 Claims, 14 Drawing Sheets

400A

Set a User Info field in a Trigger frame to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs    401A Send the trigger frame to the associated STAs and/or the unassociated STAs    402A

(51) Int. Cl.
*H04L 41/0681* (2022.01)
*H04W 84/12* (2009.01)

(58) Field of Classification Search
CPC ... H04W 74/0833–0858; H04W 84/00; H04W
84/02; H04W 84/10; H04W 84/12; H04W
60/04; H04L 12/2856; H04L 12/413;
H04L 69/322; H04L 41/0681; H04L
47/765
See application file for complete search history.

(56) References Cited

U.S. PATENT DOCUMENTS

| | | | |
|---|---|---|---|
| 2018/0255570 A1 | 9/2018 | Patil | |
| 2018/0255589 A1* | 9/2018 | Patil | H04W 74/0816 |
| 2018/0302922 A1 | 10/2018 | Patil | |
| 2018/0302923 A1 | 10/2018 | Patil | |
| 2019/0082468 A1* | 3/2019 | Ahn | H04W 74/0816 |
| 2019/0132724 A1 | 5/2019 | Asterjadhi | |
| 2019/0229862 A1 | 7/2019 | Kim | |
| 2020/0163129 A1* | 5/2020 | Ko | H04L 27/2602 |
| 2021/0068151 A1 | 3/2021 | Patil | |
| 2021/0068197 A1 | 3/2021 | Kim | |
| 2021/0127427 A1* | 4/2021 | Noh | H04W 76/15 |
| 2021/0385830 A1* | 12/2021 | Lim | H04L 5/0023 |
| 2022/0201769 A1* | 6/2022 | Li | H04W 28/26 |
| 2022/0225323 A1* | 7/2022 | Wang | H04W 74/06 |
| 2023/0276506 A1* | 8/2023 | Huang | H04W 74/006 |
| | | | 370/329 |
| 2023/0319329 A1* | 10/2023 | Henry | H04N 21/6547 |
| | | | 725/116 |
| 2023/0319902 A1* | 10/2023 | Huang | H04L 5/0007 |
| | | | 370/329 |
| 2024/0155697 A1* | 5/2024 | Ding | H04B 7/06952 |

FOREIGN PATENT DOCUMENTS

| | | | |
|---|---|---|---|
| CN | 111096044 A | 5/2020 | |
| CN | 112469088 A | 3/2021 | |
| WO | 2022099580 A1 | 5/2022 | |
| WO | WO-2022222488 A1 * | 10/2022 | H04W 74/08 |

OTHER PUBLICATIONS

Written Opinion of the International Search Authority in the international application No. PCT/CN2022/097685, mailed on Sep. 7, 2022, 5 pages.
Greg Geonjung Ko et al., "RA-RU Indication in Trigger frame", doc.: IEEE 802.11-21/0428r1, Mar. 10, 2021, the whole document, 16 pages.
Steve Shellhammer et al., "Proposed Draft Specification for Trigger frame for EHT", doc.: IEEE 802.11-21/0259r4, Mar. 5, 2021, the whole document, 43 pages.

* cited by examiner

400A

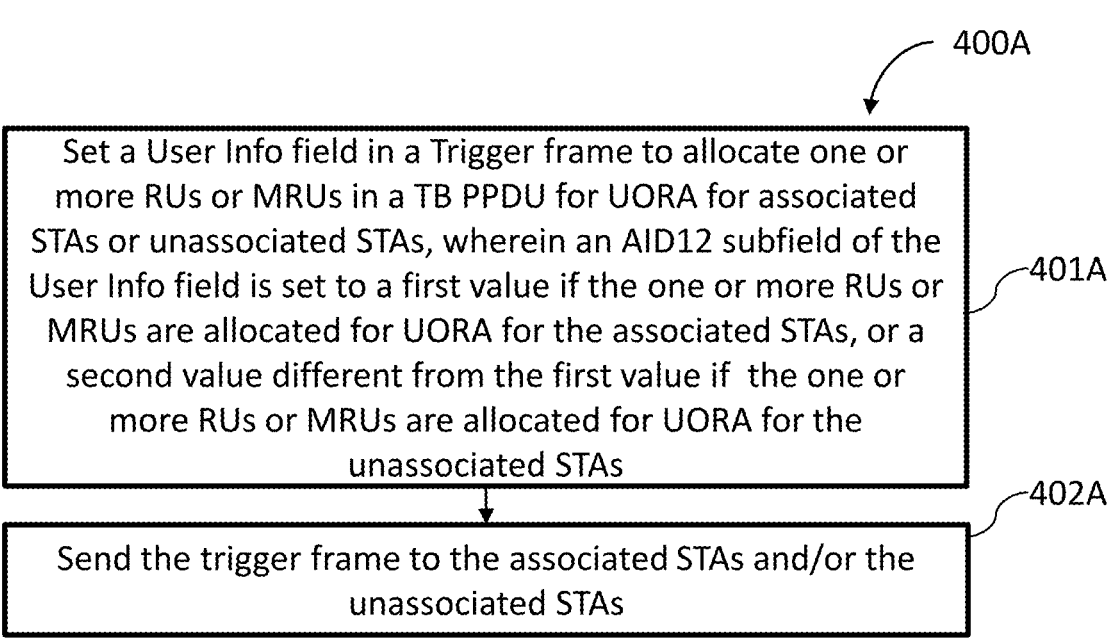

Set a User Info field in a Trigger frame to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs

401A

Send the trigger frame to the associated STAs and/or the unassociated STAs

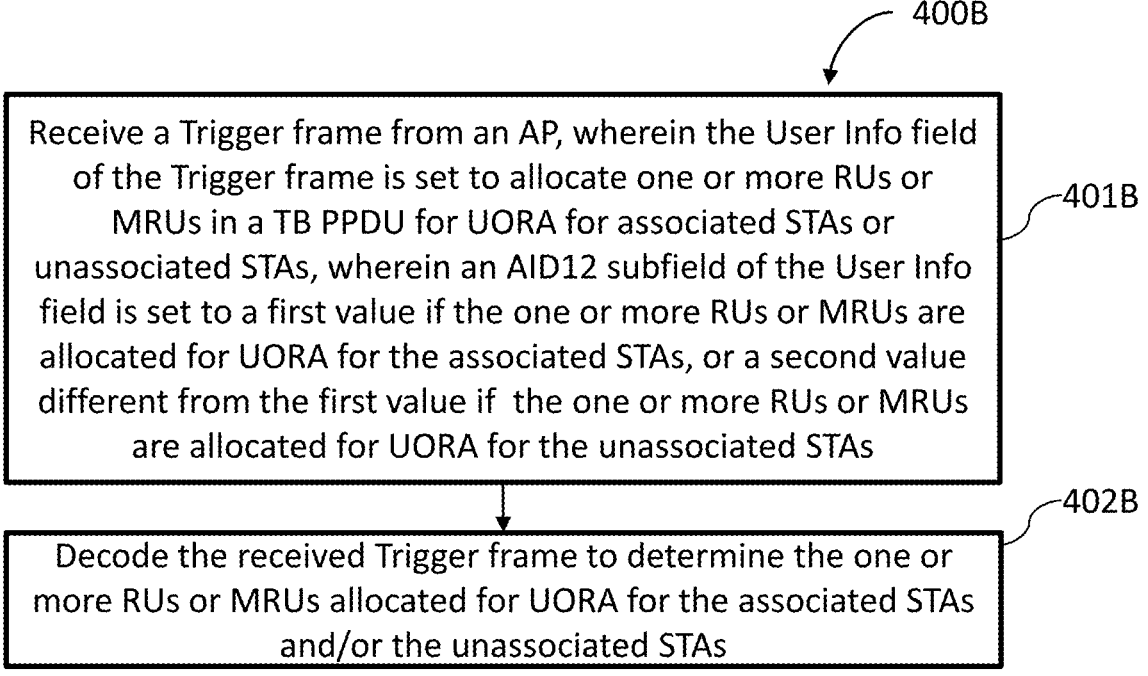

Receive a Trigger frame from an AP, wherein the User Info field of the Trigger frame is set to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs

401B

Decode the received Trigger frame to determine the one or more RUs or MRUs allocated for UORA for the associated STAs and/or the unassociated STAs

METHODS AND DEVICES FOR RANDOM ACCESS IN WIRELESS LOCAL AREA NETWORKS

CROSS-REFERENCE TO RELATED APPLICATIONS

This application is a continuation of International Application No. PCT/CN2022/097685 filed on Jun. 8, 2022, which claims the benefit of priority to Singapore Patent Application No. 10202106096W filed on Jun. 8, 2021. The entire contents of the above applications are hereby incorporated by reference in their entireties.

BACKGROUND

Institute of Electrical and Electronics Engineers (IEEE) 802.11 TGbe is developing a new IEEE 802.11 amendment which defines extremely high throughput (EHT) physical layer (PHY) and medium access control (MAC) layer capable of supporting a maximum throughput of at least 30 Gbps. To this end, it has been proposed to increase maximum channel bandwidth to 320 MHz, allow a RU or MRU to be allocated to a single station (STA) in an EHT PPDU and enable frequency domain aggregated PPDU (A-PPDU) transmission. However, it is still an open issue to efficiently allocate RUs or MRUs in a TB PPDU for UORA in IEEE 802.11be EHT WLAN.

It would therefore be desirable to provide an effective and efficient mechanism/solution for random access in a WLAN, especially in IEEE 802.11be EHT WLAN.

SUMMARY

The disclosure relates to resource allocation in a trigger-based (TB) physical layer protocol data unit (PPDU) in wireless communications, and more particularly to methods and devices for random access (RA) in a wireless local area network (WLAN), especially methods and devices suitable for resource units (RUs) or multiple resource units (MRUs) allocation in a TB PPDU for uplink Orthogonal Frequency Division Multiple Access (OFDMA) based random access (UORA).

Embodiments of the disclosure provide effective and efficient methods and devices for random access in a WLAN. In various embodiments of the disclosure, a User Info field of a Trigger frame is set to allocate one or more RUs or MRUs in a TB PPDU for UORA for associated STAs or unassociated STAs. It should be noted that the RUs allocated in a TB PPDU for UORA are also referred to as "RA-RUs" in the description, and the MRUs allocated in a TB PPDU for UORA are also referred to as "RA-MRUs".

According to a first aspect of the disclosure, various embodiments of the disclosure provide a first method for random access in a WLAN performed at an AP. The method may include: setting, by an AP, a User Info field in a Trigger frame to allocate one or more RUs or MRUs in a TB PPDU for UORA for associated STAs or unassociated STAs, wherein an association identifier (AID)12 subfield of the User Info field is set to a first value if the one or more RUs or MRUs are allocated for UORA for the associated STAs, i.e., if the one or more RA-RUs or RA-MRUs are allocated for associated STAs, or a second value different from the first value if the one or more RUs or MRUs are allocated for UORA for the unassociated STAs, i.e., if the one or more RA-RUs or RA-MRUs are allocated for unassociated STAs, and sending, by the AP, the Trigger frame to the associated STAs and/or the unassociated STAs.

According to a second aspect of the disclosure, various embodiments of the disclosure provide a second method for random access in a WLAN performed at an STA. The method may include: receiving, by an STA, a Trigger frame from an AP, wherein a User Info field in the Trigger frame is set to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs, wherein the STA is one of the associated STAs or the unassociated STAs, and decoding, by the STA, the received Trigger frame to determine the one or more RUs or MRUs allocated for UORA for the associated STAs and/or the unassociated STAs.

According to a third aspect of the disclosure, various embodiments of the disclosure provide an AP for random access in a WLAN. The AP may include: a trigger frame generation unit configured to set a User Info field in a Trigger frame to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs, and a transmission unit configured to send the Trigger frame to the associated STAs and/or the unassociated STAs.

According to a fourth aspect of the disclosure, various embodiments of the disclosure provide an STA for random access in a WLAN. The STA may include: a reception unit configured to receive a Trigger frame from an AP, wherein a User Info field in the Trigger frame is set to allocate one or more RUs or MRUs in a TB PPDU for associated STAs or unassociated STAs for UORA, wherein an AID12 subfield of the User Info field is set to a first value if the one or more RUs or MRUs are allocated for the associated STAs for UORA, or a second value different from the first value if the one or more RUs or MRUs are allocated for the unassociated STAs for UORA, wherein the STA is one of the associated STAs or the unassociated STAs, and a decoding unit configured to decode the received Trigger frame to determine the one or more RUs or MRUs allocated for UORA for the associated STAs and/or the unassociated STAs.

According to a fifth aspect of the disclosure, various embodiments of the disclosure provide an AP for random access in a WLAN. The AP may comprise a memory to store instructions for performing the first method for random access in the WLAN, and a processor communicably coupled with the memory, the processor configured to execute the instructions to perform the first method for random access in a WLAN as described in various embodiments of the disclosure.

According to a sixth aspect of the disclosure, various embodiments of the disclosure provide an STA for random access in a WLAN. The STA may comprise a memory to store instructions for performing the second method for random access in the WLAN, and a processor communicably coupled with the memory, the processor configured to execute the instructions to perform the second method for random access in a WLAN as described in various embodiments of the disclosure.

According to a seventh aspect of the disclosure, various embodiments of the disclosure provide a computer program product. The computer program product comprises instructions to cause a computer to perform the first or the second method for random access in a WLAN according to any embodiment of the disclosure, when executed thereon.

According to an eighth aspect of the disclosure, various embodiments of the disclosure provide a computer program comprising instructions to cause a computer to perform a method for random access in a WLAN according to any embodiment of the disclosure, when executed thereon.

According to a ninth aspect of the disclosure, various embodiments of the disclosure provide a chip configured to perform a method for random access in a WLAN according to any embodiment of the disclosure.

BRIEF DESCRIPTION OF THE DRAWINGS

The disclosure will be described in detail with reference to the accompanying drawings, in which:

FIG. 4A is a flowchart illustrating a first method for random access in a WLAN carried out by an AP according to some embodiments of the disclosure.

FIG. 4B is a flowchart illustrating a second method for random access in a WLAN carried out by an STA according to some embodiments of the disclosure.

DETAILED DESCRIPTION

In the following description, numerous specific details are set forth in order to provide a thorough understanding of various illustrative embodiments of the disclosure. It will be understood, however, to one skilled in the art, that embodiments of the disclosure may be practiced without some or all of these specific details. It is understood that the terminology used herein is for the purpose of describing particular embodiments only and is not intended to limit the scope of the disclosure.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels and are not intended to impose numerical requirements on their objects. As used herein, the term "configured to" is interchangeable with "operative" or "adapted to".

Figure 1A:
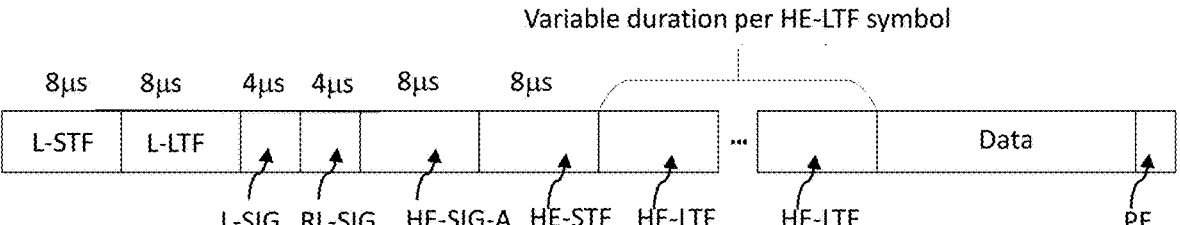
FIG. 1A is a block diagram showing a format of a high efficiency (HE) TB PPDU according to various embodiments of the disclosure.
Figure 1B:
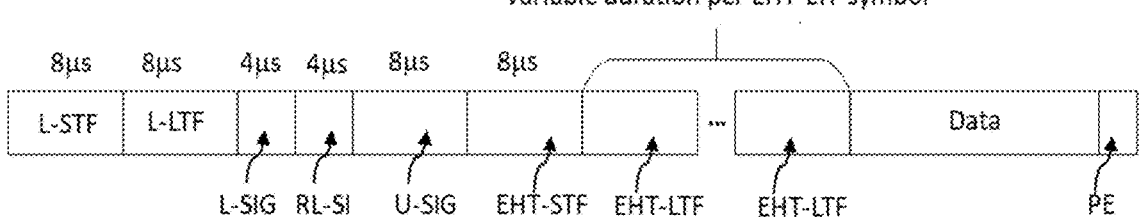
FIG. 1B is a block diagram showing a format of an EHT TB PPDU according to various embodiments of the disclosure.

In IEEE 802.11be WLAN, a TB PPDU may have any one of the following two formats: HE TB PPDU and EHT TB PPDU. The HE TB PPDU and the EHT TB PPDU are used for a transmission that is a response to a Trigger frame from an AP. FIG. 1A is a block diagram showing a format of an HE TB PPDU according to various embodiments of the disclosure. In an HE TB PPDU, the Non-HT Short Training field (L-STF), Non-HT Long Training field (L-LTF), Non-HT Signal field (L-SIG), Repeated L-SIG (RL-SIG), and HE Signal A field (HE-SIG-A) are called pre-HE modulated fields while the HE Short Training field (HE-STF), HE Long Training field (HE-LTF), Data field and packet extension field (PE) are called HE modulated fields. FIG. 1B is a block diagram showing a format of an EHT TB PPDU according to various embodiments of the disclosure. In an EHT TB PPDU, the L-STF, L-LTF, L-SIG, RL-SIG and Universal Signal field (U-SIG) are called pre-EHT modulated fields while the EHT-STF, EHT-LTF, Data field and PE are called EHT modulated fields.

Each HE-LTF or EHT-LTF symbol has the same guard interval (GI) duration as each data symbol, which is 0.8 μs, 1.6 us or 3.2 μs. The HE-LTF comprises three types: 1×HE-LTF, 2×HE-LTF and 4×HE-LTF. Similarly, the EHT-LTF comprises three types: 1×EHT-LTF, 2×EHT-LTF and 4×EHT-LTF. The duration of each 1×HE-LTF/EHT-LTF, 2×HE-LTF/EHT-LTF or 4×HE-LTF/EHT-LTF symbol without GI is 3.2 µs, 6.4 µs or 12.8 µs. Each data symbol without GI is 12.8 µs. The PE duration of a HE TB PPDU is 0 µs, 4 µs, 8 µs, 12 µs or 16 µs; while the PE duration of an EHT TB PPDU is 0 µs, 4 µs, 8 µs, 12 µs, 16 µs or 20 µs.

Figure 2A:
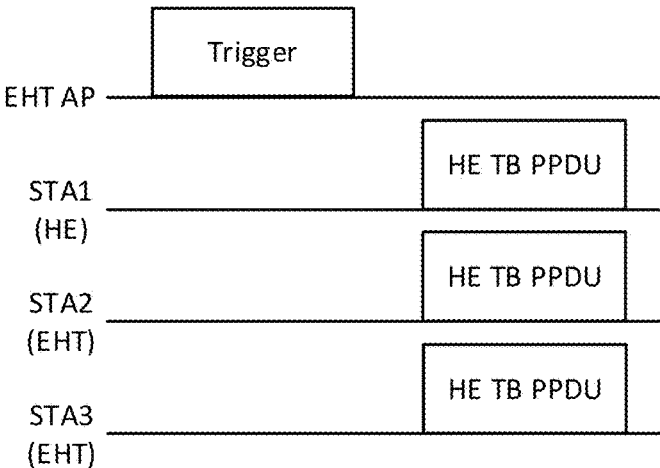
FIG. 2A is a schematic diagram illustrating a first example of uplink multi-user (UL MU) transmission according to some embodiments of the disclosure.

In IEEE 802.11be EHT WLAN, an EHT AP may transmit a Trigger frame to solicit an HE TB PPDU transmission from HE STAs and/or EHT STAs, or an EHT TB PPDU transmission from EHT STAs, or a TB A-PPDU transmission from HE STAs and/or EHT STAs. FIG. 2A is a schematic diagram illustrating a first example of uplink multiple user (UL MU) transmission according to some embodiments of the disclosure.

Figure 2B:
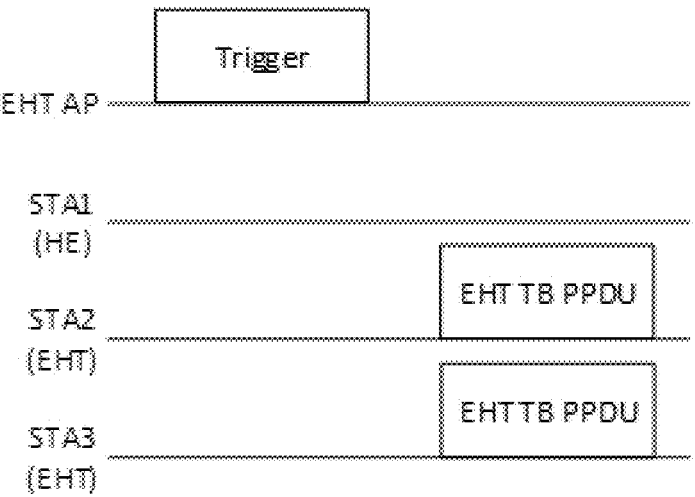
FIG. 2B is a schematic diagram illustrating a second example of UL MU transmission according to some embodiments of the disclosure.
Figure 2C:
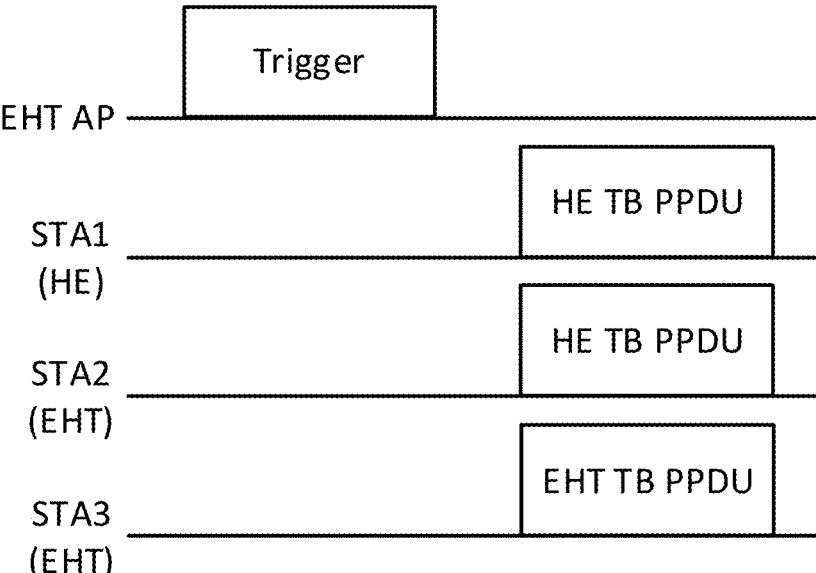
FIG. 2C is a schematic diagram illustrating a third example of UL MU transmission according to some embodiments of the disclosure.

In this example, a Trigger frame transmitted by the EHT AP to solicit an HE TB PPDU transmission from STA1 that is an HE STA, STA2 and STA3 that are EHT STAs. FIG. 2B is a schematic diagram illustrating a second example of UL MU transmission according to some embodiments of the disclosure. In this example, a Trigger frame transmitted by the EHT AP to solicit an EHT TB PPDU transmission from STA2 and STA3 that are EHT STAs. FIG. 2C is a schematic diagram illustrating a third example of UL MU transmission according to some embodiments of the disclosure. In this example, a Trigger frame transmitted by the EHT AP to solicit a TB A-PPDU transmission from STA1 that is an HE STA, and STA2 and STA3 that are EHT STAs, where STA1 and STA2 involve in an HE TB PPDU transmission and STA3 involves in an EHT TB PPDU transmission.

Figure 3A:
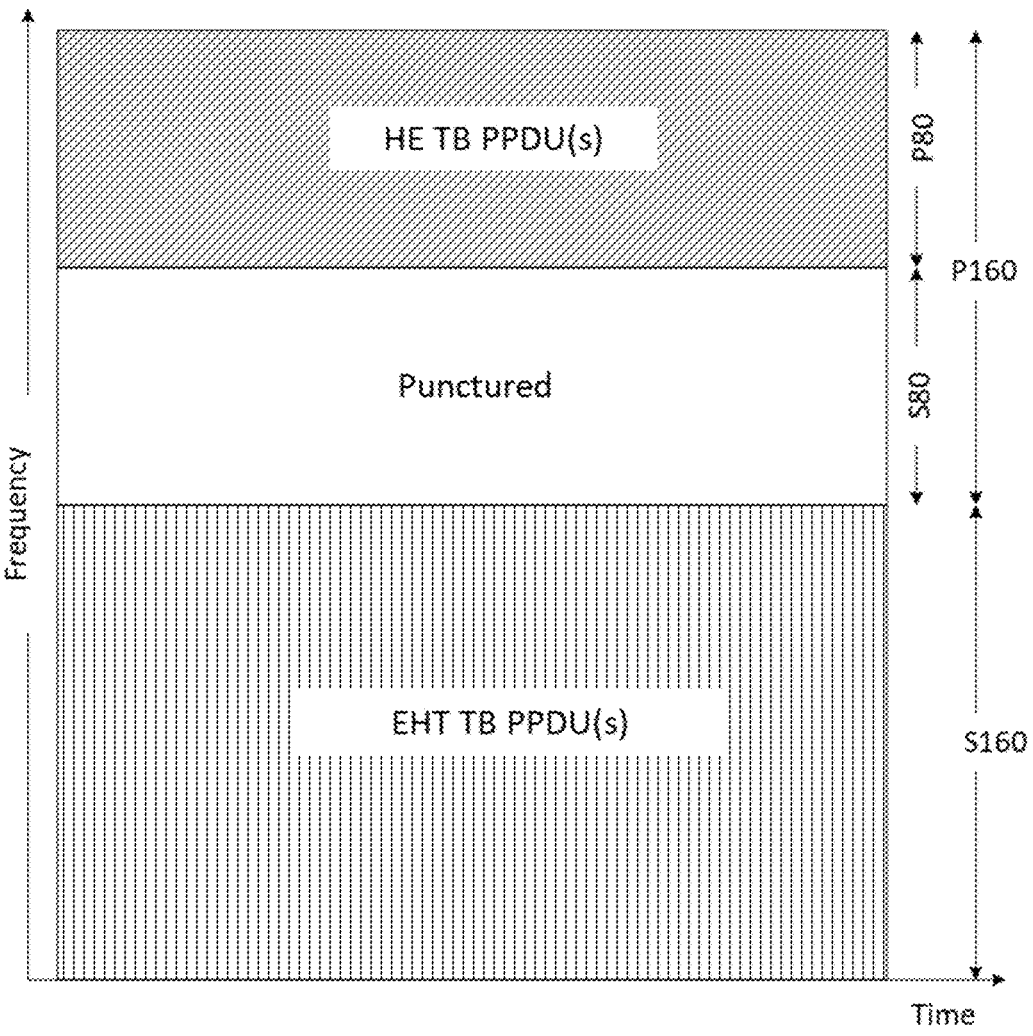
FIGS. 3A-3C are schematic diagrams showing three options for bandwidth (BW) allocation in a 320 MHz TB A-PPDU respectively according to some embodiments of the disclosure.
Figure 3B:
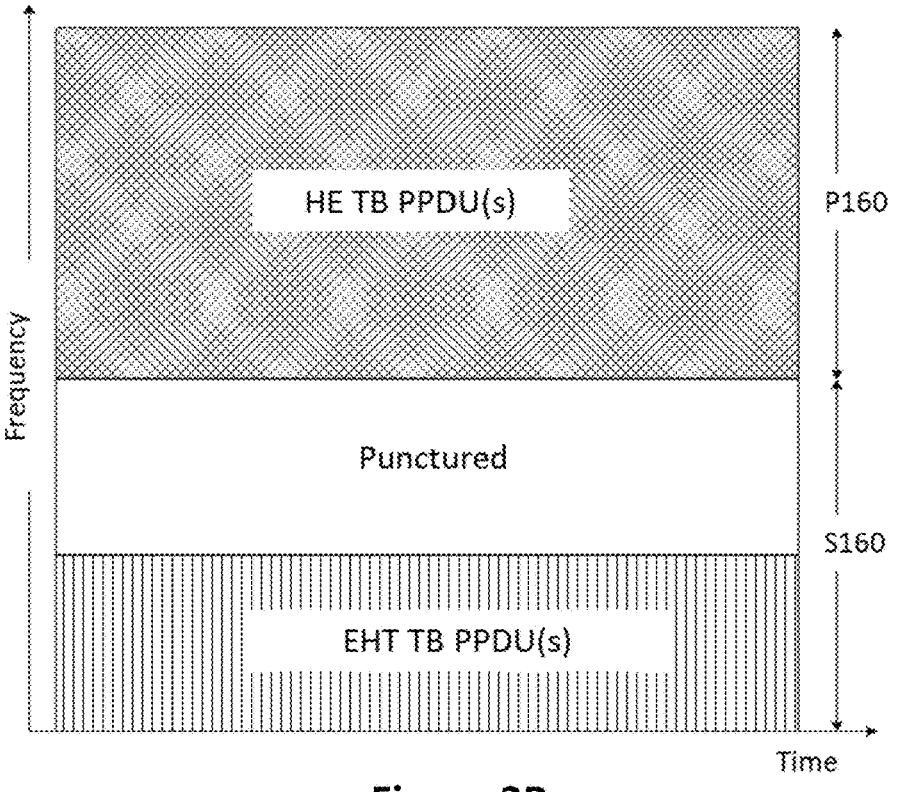
Figure 3C:
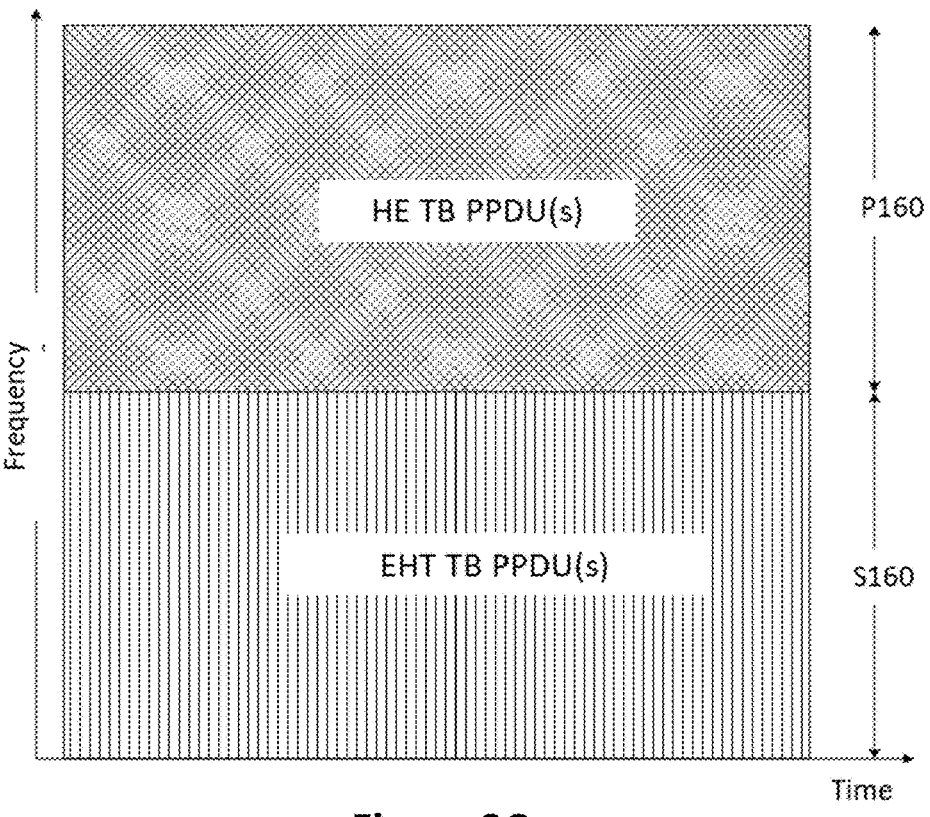

According to some embodiments of the disclosure, there are three possible options for bandwidth (BW) allocation in a 320 MHz TB Frequency domain aggregated PPDU (A-PPDU). FIGS. 3A-3C are schematic diagrams showing the three options for BW allocation in a 320 MHz TB A-PPDU respectively according to some embodiments of the disclosure.

Option 1A: When secondary 80 MHz channel (S80) is punctured, BW allocated to HE TB PPDUs is primary 80 MHz channel (P80) and BW allocated to EHT TB PPDUs is secondary 160 MHz channel (S160), as illustrated in FIG. 3A.

Option 1B: When one of two 80 MHz frequency subblocks of S160 is punctured, BW allocated to HE TB PPDUs is primary 160 MHz channel (P160) and BW allocated to EHT TB PPDUs is the other 80 MHz frequency subblock of S160, as illustrated in FIG. 3B.

Option 1C: When none of 80 MHz frequency subblocks is punctured, BW allocated to HE TB PPDUs is P160 and BW allocated to EHT TB PPDUs is S160, as illustrated in FIG. 3C.

FIG. 4A is a flowchart illustrating a first method 400A for random access in a WLAN carried out by an AP according to some embodiments of the disclosure.

At Block 401A, a User Info field in a Trigger frame is set by the AP to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs. It should be noted that the RUs allocated in a TB PPDU for UORA are also referred to as "RA-RUs" in the description, and the MRUs allocated in a TB PPDU for UORA are also referred to as "RA-MRUs".

At Block 402A, the Trigger frame is sent by the AP to the associated STAs and/or the unassociated STAs.

FIG. 4B is a flowchart illustrating a second method 400B for random access in a WLAN carried out by an STA according to some embodiments of the disclosure.

At Block 401B, a Trigger frame from an AP is received by the STA, wherein a User Info field in the Trigger frame is set to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs.

At Block 402B, the received Trigger frame is decoded by the STA to determine the one or more RUs or MRUs allocated for UORA for the associated STAs and/or the unassociated STAs.

It should be noted that the Trigger frame in the methods 400A and 400B may include a User Info List including one or more User Info fields. In some embodiments, the Trigger frame may include a plurality of User Info fields, and each of the plurality of User Info fields is set to allocate one or more RUs or MRUs in a TB PPDU for UORA for associated STAs or unassociated STAs. In one example, the Trigger frame may include a first User Info field which is set to allocate one or more RUs or MRUs in a TB PPDU for UORA for associated STAs, and a second User Info field which is set to allocate one or more RUs or MRUs in a TB PPDU for UORA for unassociated STAs. In some other examples, all of the one or more User Info fields may be set to allocate one or more RUs or MRUs in a TB PPDU for UORA for only associated STAs or only unassociated STAs.

In some embodiments, the AID12 subfield of the User Info field may be set to the first value in a range of [1, 2006], [2008, 2044] or [2047, 4094] if the one or more RUs or MRUs are allocated for UORA for the associated STAs which are EHT STAs, or the AID12 subfield is set to the second value in a range of [1, 2006], [2008, 2044] or [2047, 4094] if the one or more RUs or MRUs are allocated for UORA for the unassociated STAs which are EHT STAs. It should be noted that [1, 2006] refers to any integer between 1 and 2006, including 1 and 2006; the range of [2008, 2044] refers to any integer between 2008 and 2044, including the 2008 and 2044; and the range of [2047, 4049] refers to any integer between 2047 and 4049, including 2047 and 4049. Therefore, in some embodiments of the disclosure, each of the first value and the second value may be selected from any of the three ranges. For example, the first value may be 2000 in the range of [1, 2006], and the second value may be 2008 in the range of [2008, 2044].

In some embodiments, each of the plurality of RUs or MRUs allocated for UORA for the associated STAs or unassociated STAs may have a same size. It should be noted that the "each of the plurality of RUs or MRUs" refers to each of the plurality of RUs or each of the plurality of MRUs. That is to say, if a plurality of RUs are allocated for UORA for the associated STAs or unassociated STAs, each of the plurality of RUs may have a same size; if a plurality of MRUs are allocated for UORA for the associated STAs or unassociated STAs, each of the plurality of MRUs may have a same size.

In some embodiments, if the User Info field is set to allocate a plurality of RUs for UORA for the associated STAs or unassociated STAs, the plurality of RUs are defined and contiguous. The "contiguous" means that the RU indices of the plurality of defined RUs are contiguous excluding any RU index of any undefined RU if any. For example, if among 26-tone RU 16 to 26-tone RU 20, 26-tone RU 19 is undefined, and the remaining units, i.e., 26-tone RU 16, 26-tone RU 17, 26-tone RU 18 and 26-tone RU 20, are defined, the plurality of 26-tone RUs allocated for UORA may include 26-tone RU 16, 26-tone RU 17, 26-tone RU 18 and 26-tone RU 20, which are still considered contiguous since 26-tone RU 19 is undefined.

In some embodiments, if the User Info field is set to allocate a plurality of MRUs for UORA for the associated STAs or unassociated STAs, the plurality of MRUs are defined and may not be contiguous. The "not contiguous" means that the MRU indices of the plurality of defined MRUs are not contiguous.

In some embodiments, if the plurality of allocated MRUs are 484+242-tone MRUs and the TB PPDU has a bandwidth of 160 MHz or 320 MHz, the plurality of allocated MRUs do not overlap in frequency domain and belong to different 80 MHz subblocks.

In some embodiments, the User Info field may be further set to indicate a starting RU or MRU of the one or more allocated RUs or MRUs and a count number N of the allocated one or more RUs or MRUs.

In some embodiments, a first subfield of the User Info field may be set to indicate that the count number N of the allocated MRUs, wherein the count number N is 1 if each allocated MRU is a 106+26-tone MRU and the TB PPDU has a bandwidth of 20 MHz, or if each allocated MRU is a 484+242-tone MRU and the TB PPDU has a bandwidth of 80 MHz, or if each allocated MRU is a 996+484-tone MRU and the TB PPDU has a bandwidth of 160 MHz or 320 MHz; or if each allocated MRU is a 2×996+484-tone MRU, 3×996-tone MRU or 3×996+484-tone MRU and the TB PPDU has a bandwidth of 320 MHz.

In some embodiments, the User Info field may be further configured to include a second subfield and a third subfield which are set to indicate a starting RU or MRU of the one or more allocated RUs or MRUs. In some embodiments, there may be only one subfield is required to indicate the starting RU or MRU.

In some embodiments, if the starting RU or MRU is a 484+242-tone MRU, the User Info field may be set to allocate N MRUs for UORA for the associated or unassociated STAs, wherein N is an integer greater than 1 and the N allocated MRUs comprise the starting MRU and N−1 subsequent MRUs after the starting MRU, wherein each subsequent MRU is separated by three MRUs from an adjacent allocated MRU thereof.

In some embodiments, if the starting RU or MRU is an MRU with a size smaller than 242 tones, the User Info field may be set to allocate N MRUs for UORA for the associated or unassociated STAs, wherein N is an integer greater than 1 and the N allocated MRUs comprise the starting MRU and N−1 subsequent defined MRUs after the starting MRU, wherein each subsequent defined MRU is separated by one defined MRU from an adjacent allocated MRU thereof. Alternatively, the User Info field may be set to allocate N MRUs for UORA for the associated or unassociated STAs, wherein N is an integer greater than 1 and the N allocated MRUs comprise the starting MRU and (N−1) subsequent defined MRUs immediately after the starting MRU excluding any MRU that overlaps with its preceding MRU.

In some embodiments, the User Info field may be set to allocate the one or more RUs or MRUs within a P160 or a S160 if the TB PPDU is a 320 MHz TB A-PPDU.

Although the method 400A is carried out by the AP, it is to be appreciated by a person skilled in the art that the embodiments in the description are provided for illustration purpose only, not to limit the scope of the disclosure. In other words, even if the User Info field or part of the User Info field is not set by the AP, as long as the User Info field in the Trigger frame is set to allocate one or more RUs or MRUs for UORA for associated or unassociated STAs and a subfield of the User Info field is set to indicate whether the one or more RUs or MRUs for UORA are allocated for associated or unassociated STAs, it should be covered by the disclosure.

In some embodiments of the disclosure, at least one User Info field in the Trigger frame is set to allocate one or more RUs or MRUs in a TB PPDU for UORA for associated STAs or unassociated STAs. An AID12 subfield of each of the at least one User Info field may be set to a predetermined value depending on whether the one or more RUs or MRUs for UORA are allocated for associated STAs or unassociated STAs. Specifically, the AID12 subfield may be set to a first value if the one or more RUs or MRUs for UORA are allocated for the associated STAs, or a second value different from the first value if the one or more RUs or MRUs are allocated for UORA for the unassociated STAs.

Figures 4C, 5:
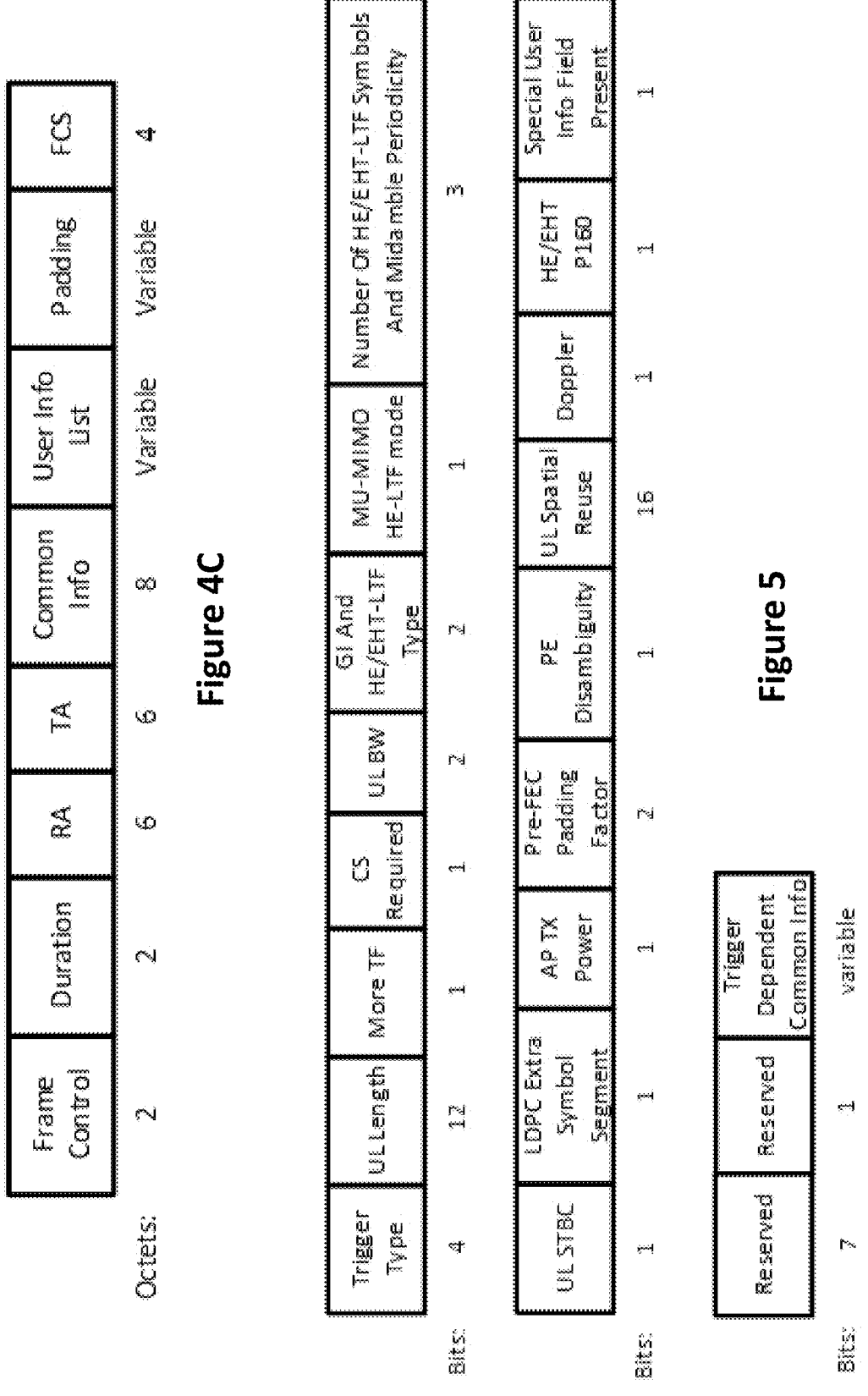
FIG. 4C is a block diagram illustrating a format of a Trigger frame according to some embodiments of the disclosure.
FIG. 5 is a block diagram illustrating a format of an EHT variant Common Info field according to some embodiments of the disclosure.

FIG. 4C is a block diagram illustrating a format of a Trigger frame according to some embodiments of the disclosure. As shown in FIG. 4C, the Trigger frame may include a Common Info field and a User Info List field. The User Info List field may include one or more User Info fields. The formats of the Common Info field and User Info field depend on the type of the Trigger frame.

Common Info Field

In various embodiments of the disclosure, the Common Info field of the Trigger frame may include two variants: HE variant and EHT variant. An HE STA interprets the Common Info field of a received Trigger frame as the HE variant Common Info field, while an EHT STA interprets the Common Info field of a received Trigger frame as the EHT variant Common Info field.

FIG. 5 is a block diagram illustrating a format of an EHT variant Common Info field according to some embodiments of the disclosure. As shown in FIG. 5, the EHT variant Common Info field includes an HE/EHT P160 subfield, a Special User Info field Present subfield, a UL BW subfield, a GI And HE/EHT-LTF Type subfield, a MU-MIMO HE-LTF Mode subfield, a Doppler subfield, and a Number of HE/EHT-LTF Symbols And Midamble Periodicity subfield. It should be noted that the names and the order of the subfields in the EHT variant Common Infor field as shown in FIG. 5 are only for illustration purpose, not to limit the scope of the disclosure. In other embodiments, the names and order of the subfields may be different.

In some embodiments, the HE/EHT P160 subfield may be set to 0 to indicate that the solicited TB PPDU on the P160 is an EHT TB PPDU and set to 1 to indicate that the solicited TB PPDU on the P160 is an HE TB PPDU. The Special User Info Field Present subfield may be set to 1 to indicate that the Special User Info field is not present in the Trigger frame and set to 0 to indicate that the Special User Info field is present in the Trigger frame. The Special User Info field, if present, is located immediately after the Common Info field of the Trigger frame and carries the non-derived subfields of the U-SIG of the solicited EHT TB PPDU.

In some embodiments, an EHT STA shall not send an HE TB PPDU on the S160. As a result, the HE/EHT P160 subfield of the Common Info field may be set to 0 and the Special User Info Field Present subfield of the Common Info field may be set to 0 in a Trigger frame soliciting an EHT TB PPDU. The HE/EHT P160 subfield of the Common Info field may be set to 1 and the Special User Info Field Present subfield of the Common Info field may be set to 0 in a Trigger frame soliciting a TB A-PPDU. The HE/EHT P160 subfield of the Common Info field may be set to 1 and the Special User Info Field Present subfield of the Common Info field may be set to 1 in a Trigger frame soliciting an HE TB PPDU.

In some embodiments, the UL BW subfield may be set to indicate the bandwidth in the HE-SIG-A of the solicited HE TB PPDU, and/or the UL BW subfield of the Common Info field along with the UL BW Extension subfield of the Special User Info field may be set to indicate the bandwidth in the U-SIG of the solicited EHT TB PPDU. The GI And HE/EHT-LTF Type subfield may be set to indicate the GI and HE-LTE type of the solicited HE TB PPDU, and/or the GI and EHT-LTE type of the solicited EHT TB PPDU. The MU-MIMO HE-LTF Mode subfield may be set to indicate the HE-LTF mode for the solicited HE TB PPDU that has an RU that spans the entire bandwidth and that is assigned for UL MU-MIMO. The MU-MIMO HE-LTF Mode subfield may be reserved in a Trigger frame soliciting an EHT TB PPDU. The Doppler subfield may be set to 1 to indicate that a midamble is present in the solicited HE TB PPDU and set to 0 otherwise. The Doppler subfield may be reserved in a Trigger frame soliciting an EHT TB PPDU.

In some embodiments, the Doppler subfield may be set to 0 in a Trigger frame soliciting an EHT TB PPDU or a TB A-PPDU; and set to either 0 or 1 in a Trigger frame soliciting an HE TB PPDU. In other words, the Doppler subfield may be set to 0 when the Special User Info Field Present subfield is set to 0 in a same Trigger frame. If the Doppler subfield is set to 0, the Number Of HE/EHT-LTF Symbols And Midamble Periodicity subfield may be set to indicate the number of HE-LTF symbols present in the solicited HE TB PPDU and/or the number of EHT-LTF symbols present in the solicited EHT TB PPDU. If the Doppler subfield is set to 1, then the Number Of HE/EHT-LTF Symbols And Midamble Periodicity subfield may be set to indicate the number of HE-LTF symbols and the periodicity of the midamble present in the solicited HE TB PPDU.

User Info Field for RA-RU/MRU Allocation

In various embodiments of the disclosure, the User Info field of a Trigger frame may include two variants: HE variant and EHT variant. An EHT STA addressed by an HE variant User Info field of a Trigger frame may respond with an HE TB PPDU. An EHT STA addressed by an EHT variant User Info field of a Trigger frame may respond with an EHT TB PPDU.

In various embodiments of the disclosure, a User Info field of a Trigger frame may be used to allocate one or more RA-RUs or RA-MRUs, i.e., one or more RUs or MRUs for UORA. In some embodiments, a User Info field with an AID12 subfield set to a first value, e.g., 0, may be used to allocate one or more contiguous RA-RUs for associated HE STAs; and a User Info field with the AID12 subfield set to a second value, e.g., 2045, may be used to allocate one or more contiguous RA-RUs for unassociated HE STAs. A User Info field with the AID12 subfield set to the first value or the second value, e.g., 0 or 2045, is an HE variant User Info field; and one or more contiguous RA-RUs in a 320 MHz TB A-PPDU allocated by an HE variant User Info field with the AID12 subfield set to the first value or the second value is within P160. It should be noted that an EHT STA is also an HE STA, the RA-RUs allocated by the User Info field with the AID12 subfield set to the first value can be used by associated EHT STAs; while the RA-RUs allocated by the User Info field with the AID12 subfield set to the second value can be used by unassociated EHT STAs.

Further, if more than one RA-RUs or RA-MRUs are allocated, each of the allocated RA-RUs or RA-MRUs may have a same size.

In some embodiments, a User Info field with the AID12 subfield set to a first value in [1, 2006], [2008, 2044] or [2047, 4094] may be used to allocate one or more RA-RUs or RA-MRUs for associated EHT STAs; and a User Info field with the AID12 subfield set to a second value in [1, 2006] or [2008, 2044] or [2047, 4094] which is different from the first value may be used to allocate one or more RA-RUs or RA-MRUs for unassociated EHT STAs. Further, if more than one RA-RUs or RA-MRUs are allocated for the associated or unassociated EHT STAs, each of the allocated RA-RUs or RA-MRUs may have a same size.

In some embodiments, if a plurality of RA-RUs with a same size are allocated for the associated STAs or unassociated STAs by a User Info field with the AID12 subfield set to the first value or the second value, the plurality of RA-RUs are defined and contiguous.

In some embodiments, if a plurality of RA-MRUs with a same size are allocated for the associated STAs or unassociated STAs by a User Info field with the AID12 subfield set to the first value or the second value, the plurality of RA-MRUs are defined and may not be contiguous.

Figure 6A:
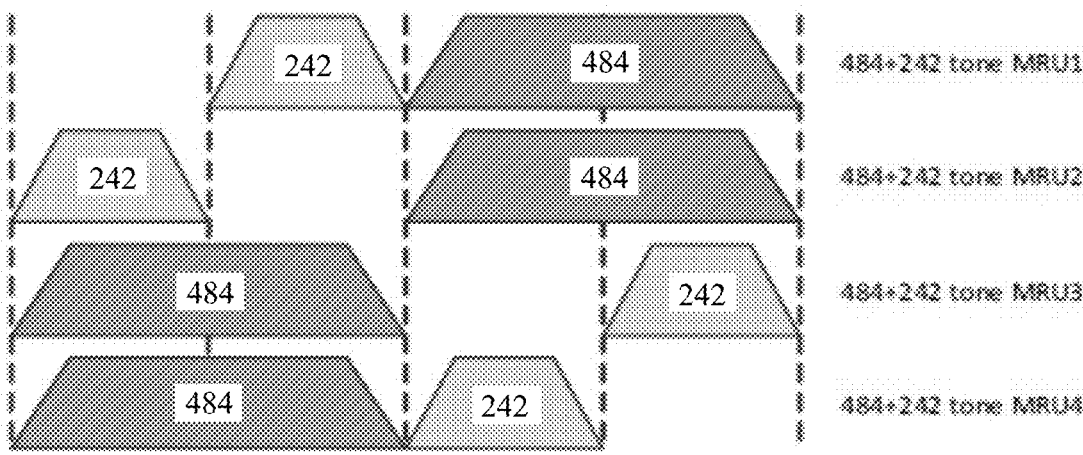
FIGS. 6A-6E are schematic diagrams illustrating allowed large size MRUs in an OFDMA EHT PPDU according to various embodiments of the disclosure.
Figure 6B:
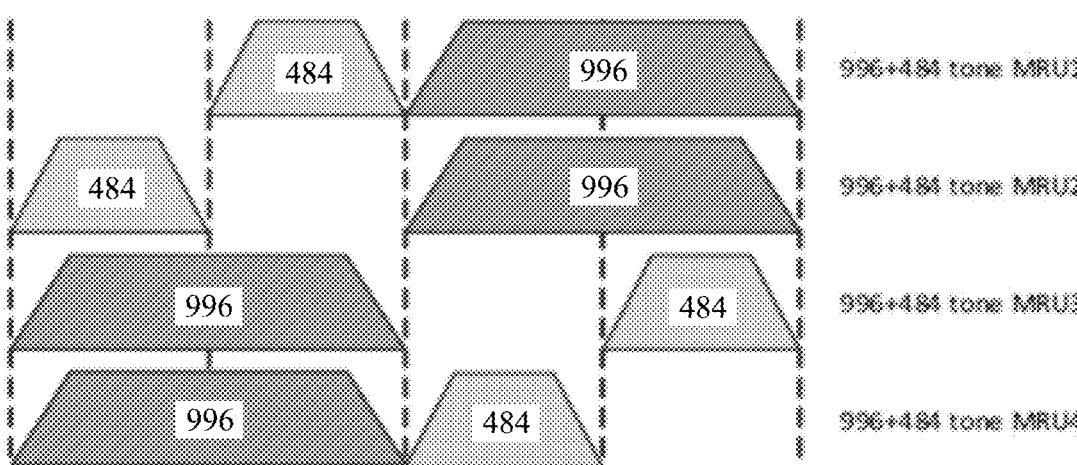
Figure 6C:
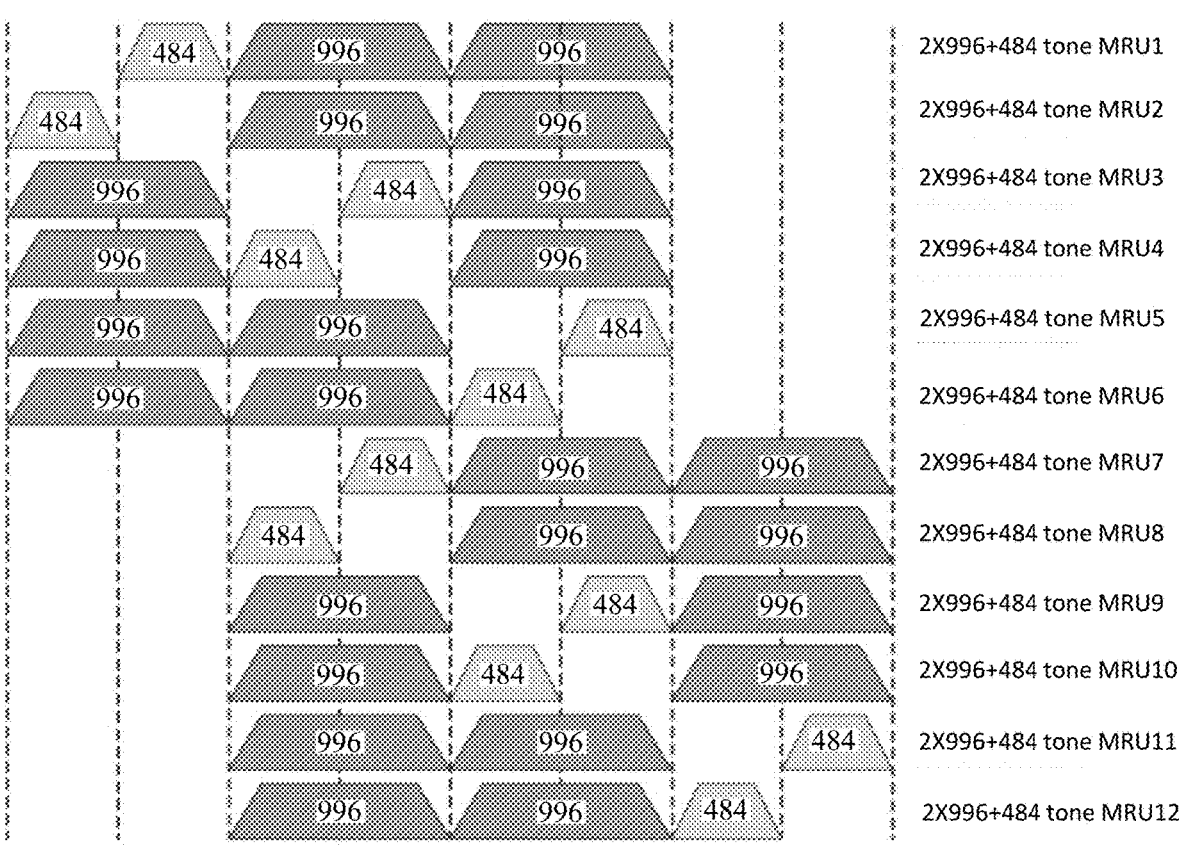
Figure 6D:
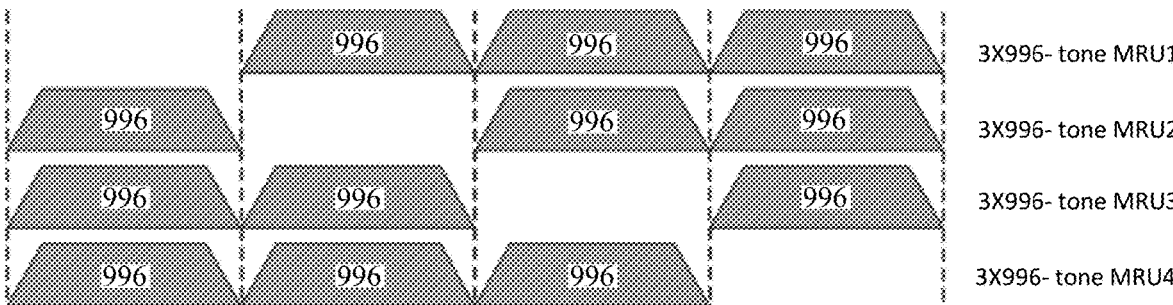
Figure 6E:
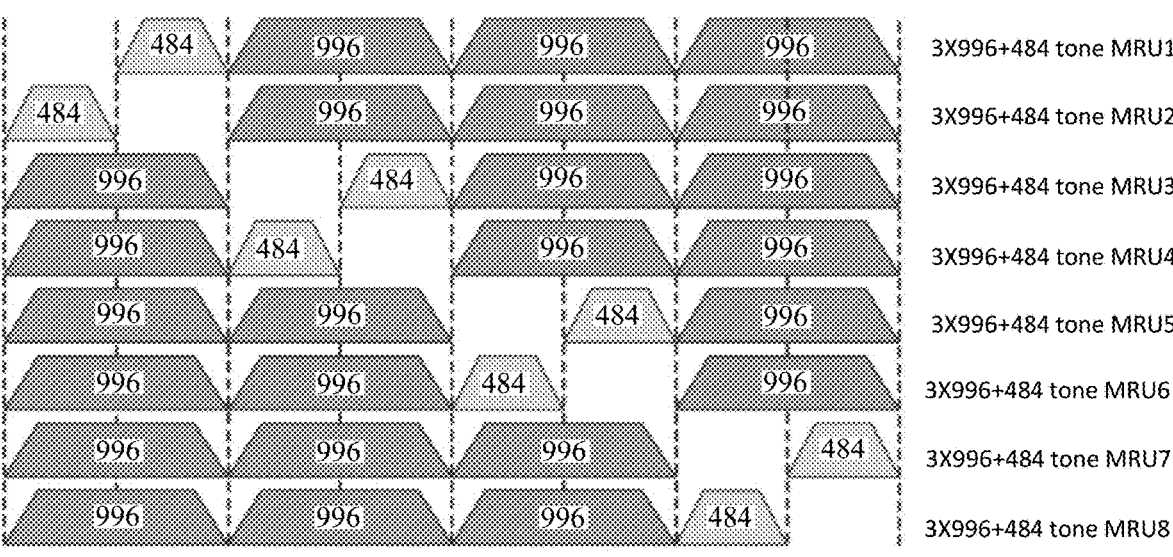

In some embodiments, a large-size MRU with a size larger than 242 tones may be allocated for the associated STAs or unassociated STAs. Large size MRUs allowed for OFDMA EHT PPDU include 484+242 tone MRUs which are applicable to 80 MHz, 160 MHz or OFDMA 320 MHz EHT PPDU; 996+484 tone MRUs which are applicable to OFDMA 160 MHz or 320 MHz EHT PPDU; 2×996+484 tone MRUs which are applicable to OFDMA 320 MHz EHT PPDU; 3×996 tone MRUs which are applicable to OFDMA 320 MHz EHT PPDU; and 3×996+484 tone MRUs which are applicable to OFDMA 320 MHz EHT PPDU. FIGS. 6A-6E are schematic diagrams illustrating the allowed large size MRUs in an OFDMA EHT PPDU according to various embodiments of the disclosure. The allowed 484+242-tone MRUs in OFDMA 80 MHz EHT PPDU are illustrated in FIG. 6A. For OFDMA transmission in 160 MHz and 320 MHz, the allowed 484+242-tone MRUs in OFDMA 80 MHz EHT PPDU are allowed in each 80 MHz subblock of OFDMA 160 MHz or 320 MHz EHT PPDU. The allowed 996+484-tone MRUs in OFDMA 160 MHz EHT PPDU are illustrated in FIG. 6B. For OFDMA transmission in 320 MHz, the allowed 996+484-tone MRUs in OFDMA 160 MHz EHT PPDU are allowed only within P160 or S160. The allowed 2×996+484-tone MRUs, 3×996-tone MRUs and 3×996+484-tone MRUs in OFDMA 320 MHz EHT PPDU are illustrated in FIGS. 6C, 6D and 6E, respectively.

It can be observed from FIGS. 6B to 6E that the allowed 996+484-tone MRUs in OFDMA 160 MHz or 320 MHz EHT PPDU overlap in frequency domain; and 2×996+484-tone MRUs, 3×996-tone MRUs or 3×996+484-tone MRUs in OFDMA 320 MHz EHT PPDU overlap in frequency domain as well. According to various embodiments of the disclosure, a User Info field with the AID12 subfield set to the first value or the second value shall not allocate more than one 996+484-tone RA-MRUs in 160 MHz or 320 MHz EHT TB PPDU in order to avoid collision among transmissions at the allocated RA-MRUs. Similarly, a User Info field with the AID12 subfield set to the first value or the second value shall not allocate more than one 2×996+484-tone RA-MRUs, 3×996-tone RA-MRUs, or 3×996+484-tone RA-MRUs in 320 MHz EHT TB PPDU.

It can be observed from FIG. 6A that the allowed 484+242-tone MRUs in OFDMA 80 MHz EHT PPDU overlap in frequency domain. According to various embodiments of the disclosure, a User Info field with the AID12 subfield set to the first value or the second value shall not allocate more than one 484+242-tone RA-MRU in 80 MHz EHT TB PPDU in order to avoid collision among transmissions at the allocated RA-MRUs. However, a User Info field with the AID12 subfield set to the first value or the second value may allocate a plurality of 484+242-tone RA-MRUs that do not overlap in frequency domain in 160 MHz or 320 MHz EHT TB PPDU. In one embodiment, the plurality of allocated 484+242-tone RA-MRUs may belong to different 80 MHz subblocks in a 160 MHz or 320 MHz EHT TB PPDU. For example, referring to indices for 484+242-tone MRUs in an OFDMA 320 MHz EHT PPDU as shown in Table 1, a User Info field with the AID12 subfield set to the first value or the second value may allocate 484+242-tone MRU 1 and 484+242-tone MRU 5 that belong to different 80 MHz subblocks for UORA in a 320 MHz EHT TB PPDU. However, a User Info field with the AID12 subfield set to the first value or the second value shall not allocate 484+242-tone MRU 1 and 484+242-tone MRU 3 that belong to a same 80 MHz subblock for UORA in a 320 MHz EHT TB PPDU.

TABLE 1

| MRU type | MRU index | Combinations |
|---|---|---|
| 484 + 242-tone MRU | MRU 1 | 484 + 242-tone MRU; [empty-RU242 RU242 RU484] in lower 80 MHz channel in lower 160 MHz |
| | MRU 2 | 484 + 242-tone MRU; [RU242 empty-RU242 RU484] in lower 80 MHz channel in lower 160 MHz |
| | MRU 3 | 484 + 242-tone MRU; [RU484 empty-RU242 RU242] in lower 80 MHz channel in lower 160 MHz |
| | MRU 4 | 484 + 242-tone MRU; [RU484 RU242 empty-RU242] in lower 80 MHz channel in lower 160 MHz |
| | MRU 5 | 484 + 242-tone MRU; [empty-RU242 RU242 RU484] in upper 80 MHz channel in lower 160 MHz |
| | MRU 6 | 484 + 242-tone MRU; [RU242 empty-RU242 RU484] in upper 80 MHz channel in lower 160 MHz |
| | MRU 7 | 484 + 242-tone MRU; [RU484 empty-RU242 RU242] in upper 80 MHz channel in lower 160 MHz |
| | MRU 8 | 484 + 242-tone MRU; [RU484 RU242 empty-RU242] in upper 80 MHz channel in lower 160 MHz |
| | MRU 9 | 484 + 242-tone MRU; [empty-RU242 RU242 RU484] in lower 80 MHz channel in upper 160 MHz |
| | MRU 10 | 484 + 242-tone MRU; [RU242 empty-RU242 RU484] in lower 80 MHz channel in upper 160 MHz |
| | MRU 11 | 484 + 242-tone MRU; [RU484 empty-RU242 RU242] in lower 80 MHz channel in upper 160 MHz |
| | MRU 12 | 484 + 242-tone MRU; [RU484 RU242 empty-RU242] in lower 80 MHz channel in upper 160 MHz |
| | MRU 13 | 484 + 242-tone MRU; [empty-RU242 RU242 RU484] in upper 80 MHz channel in upper 160 MHz |
| | MRU 14 | 484 + 242-tone MRU; [RU242 empty-RU242 RU484] in upper 80 MHz channel in upper 160 MHz |
| | MRU 15 | 484 + 242-tone MRU; [RU484 empty-RU242 RU242] in upper 80 MHz channel in upper 160 MHz |
| | MRU 16 | 484 + 242-tone MRU; [RU484 RU242 empty-RU242] in upper 80 MHz channel in upper 160 MHz |

According to some embodiments of the disclosure, a User Info field with the AID12 subfield set to the first value or the second value may be set to indicate a starting RU or MRU of the one or more allocated RA-RUs or RA-MRUs and a count number N of the allocated one or more RA-RUs or RA-MRUs.

In some embodiments, the User Info field may be set to indicate a starting large-size RA-MRU and a count number N of the allocated large-size RA-MRUs. In some examples, the count number may be equal to 1 if the allocated RA-MRU is a 106+26-tone MRU and the TB PPDU has a bandwidth of 20 MHz, or if the allocated RA-MRU is a 484+242-tone MRU and the TB PPDU has a bandwidth of 80 MHz, or if the allocated RA-MRU is a 996+484-tone MRU and the TB PPDU has a bandwidth of 160 MHz or 320 MHz; or if the allocated RA-MRU is a 2×996+484-tone MRU, 3×996-tone MRU or 3×996+484-tone MRU and the TB PPDU has a bandwidth of 320 MHz.

In some embodiments, the count number N may be larger than 1 if the starting RA-MRU is a 484+242-tone RA-MRU. In a first embodiment, the allocated N large-size RA-MRUs may include the starting large-size RA-MRU and (N−1) subsequent large-size RA-MRUs after the starting RA-MRU, wherein each subsequent RA-MRU is separated by three RA-MRUs from an adjacent allocated RA-MRU thereof. For one example, if a User Info field with the AID12 subfield set to the first value or the second value is used to allocate three 484+242-tone MRUs for UORA in a 320 MHz EHT TB PPDU with the 484+242-tone MRU 3 as the starting RA-MRU, the allocated three 484+242-tone MRUs include 484+242-tone MRU 3, 484+242-tone MRU 7 and 484+242-tone MRU 11. For another example, if a User Info field with the AID12 subfield set to the first value or the second value is used to allocate three 484+242-tone MRUs for UORA in a 320 MHz EHT TB PPDU with 484+242-tone MRU 5 as the starting RA-MRU, the allocated three 484+242-tone MRUs comprise 484+242-tone MRU 5, 484+242-tone MRU 9 and 484+242-tone MRU 13.

Figure 7A:
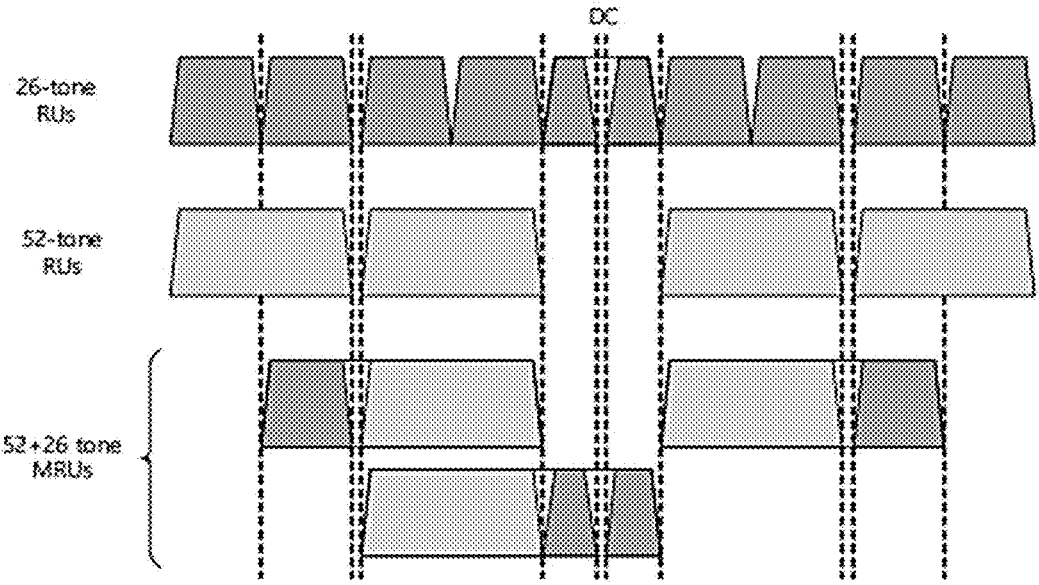
FIGS. 7A-7F are schematic diagrams illustrating allowed small size MRUs in an OFDMA EHT PPDU according to various embodiments of the disclosure.
Figures 7B, 7C:
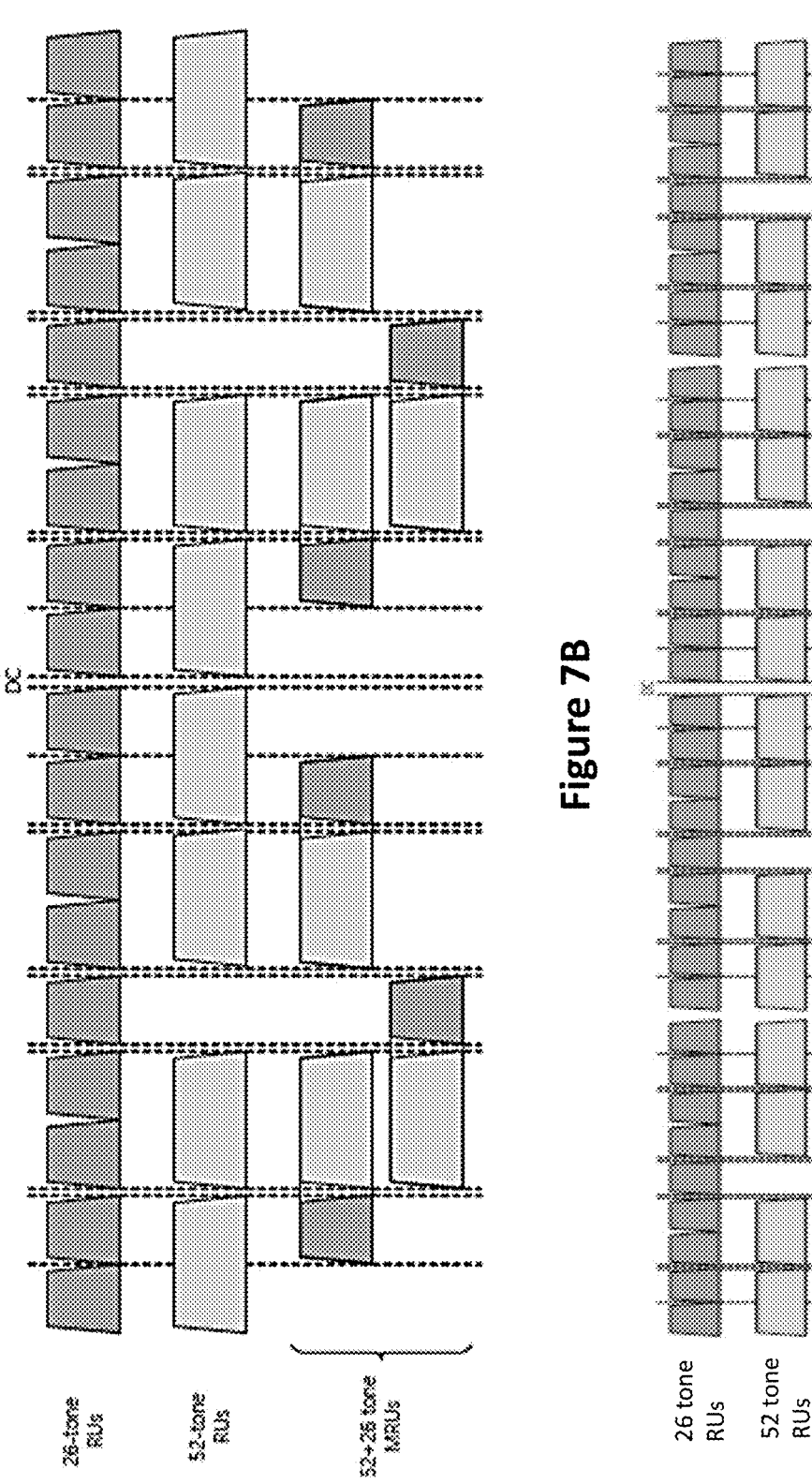
Figure 7D:
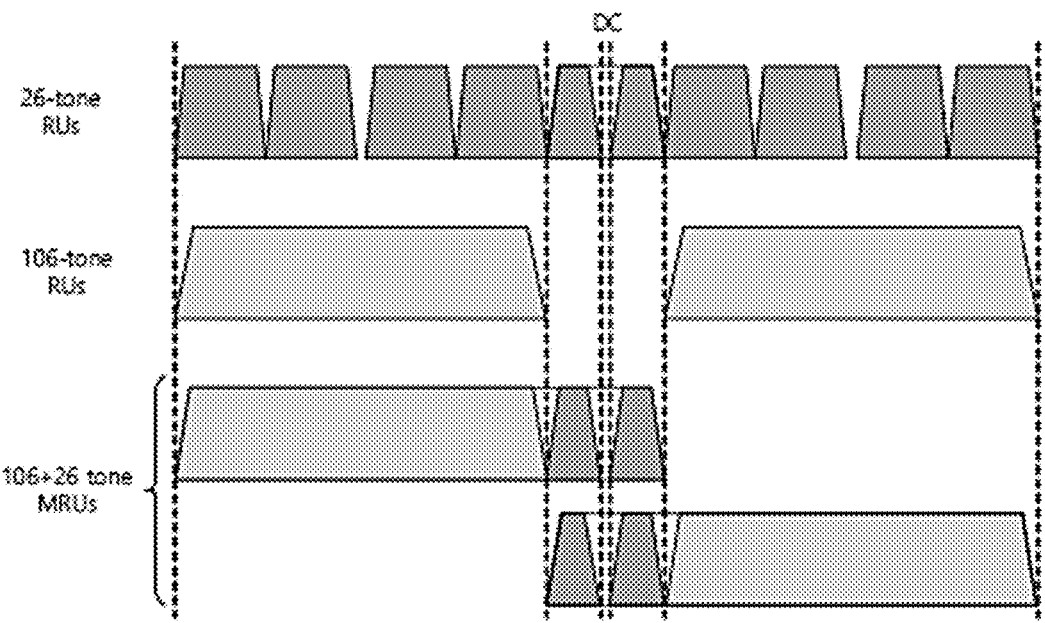
Figure 7E:
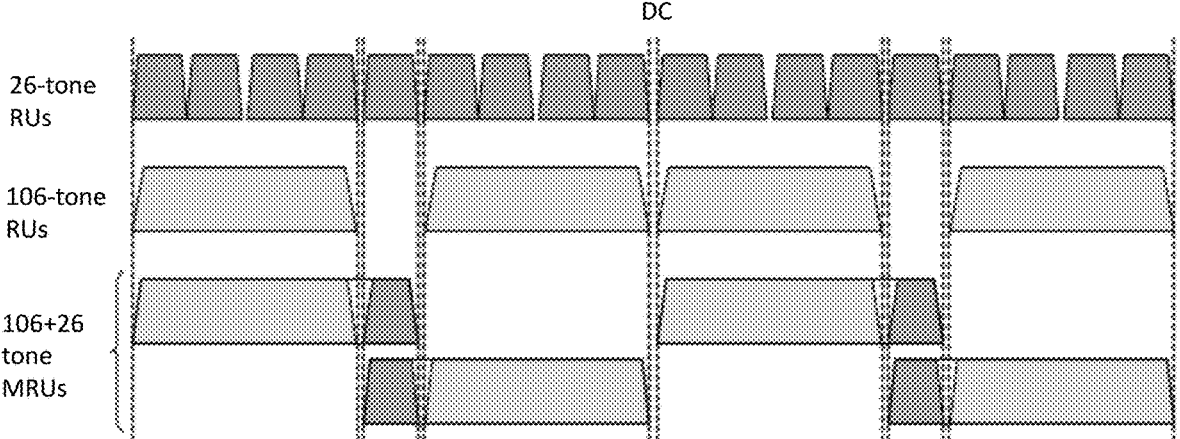
Figures 7F, 8A:
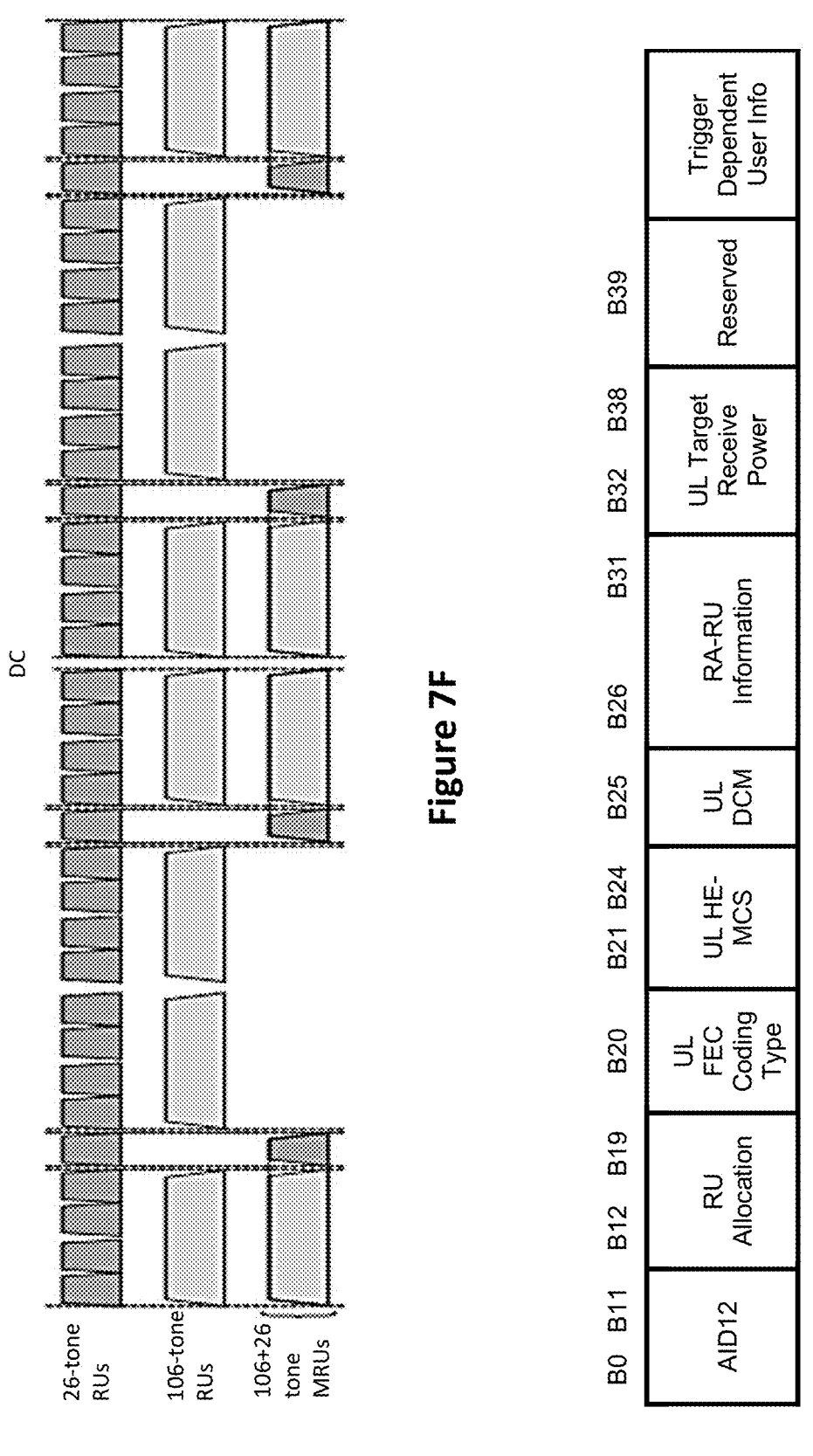
FIG. 8A is a block diagram illustrating a format of an HE variant User Info field according to some embodiments of the disclosure.

In some embodiments of the disclosure, a small-size MRU with a size smaller than 242 tones may be allocated for the associated STAs or unassociated STAs. Small size MRUs allowed for OFDMA EHT PPDU include 52+26-tone MRUs and 106+26-tone MRUs which are applicable to OFDMA 20 MHz, 40 MHz, 80 MHz, 160 MHz or 320 MHz EHT PPDU. FIGS. 7A-7F are schematic diagrams illustrating the allowed small size MRUs in an OFDM EHT PPDU according to various embodiments of the disclosure. The allowed 52+26-tone MRUs in OFDMA 20 MHz and 40 MHz EHT PPDUs are illustrated in FIGS. 7A and 7B, respectively. The allowed 52+26-tone MRUs in each 80 MHz subblock of an OFDMA 80 MHz, 160 MHz or 320 MHz EHT PPDU are illustrated in FIG. 7C. The allowed 106+26-tone MRUs in OFDMA 20 MHz and 40 MHz EHT PPDUs are illustrated in FIGS. 7D and 7E, respectively. The allowed 106+26-tone MRUs in each 80 MHz subblock of OFDMA 80 MHz, 160 MHz or 320 MHz EHT PPDU are illustrated in FIG. 7F.

It can be observed from FIG. 7A to 7C that not all the allowed 52+26-tone MRUs in OFDMA 20 MHz, 40 MHz, 80 MHz, 160 MHz or 320 MHz EHT PPDU overlap in frequency domain. In some embodiments of the disclosure, a User Info field with the AID12 subfield set to the first value or the second value may be set to allocate a plurality of 52+26-tone MRUs which do not overlap in frequency domain in a 20 MHz, 40 MHz, 80 MHz, 160 MHz or 320 MHz EHT TB PPDU. For example, referring to indices for small size MRUs in OFDMA 80 MHz EHT PPDU as shown in Table 2, a User Info field with the AID12 subfield set to the first value or the second value may be set to allocate 52+26-tone MRU 3 and 52+26-tone MRU 4 for UORA in an 80 MHz EHT TB PPDU. However, a User Info field with the AID12 subfield set to the first value or the second value shall not be set to allocate 52+26-tone MRU 4 and 52+26-tone MRU 5 for UORA in the 80 MHz EHT TB PPDU since 52+26-tone MRU 4 and 52+26-tone MRU 5 share 52-tone RU 6.

TABLE 2

| MRU type | MRU index | MRU combination |
|---|---|---|
| 52 + 26-tone MRU | MRU 1 | Not defined |
| | MRU 2 | 52-tone RU 2 + 26-tone RU 5 |
| | MRU 3 | 52-tone RU 3 + 26-tone RU 8 |
| | MRU 4 | 52-tone RU 6 + 26-tone RU 11 |
| | MRU 5 | 52-tone RU 6 + 26-tone RU 14 |
| | MRU 6 | Not defined |
| | MRU 7 | Not defined |
| | MRU 8 | 52-tone RU 10 + 26-tone RU 24 |
| | MRU 9 | 52-tone RU 11 + 26-tone RU 27 |
| | MRU 10 | 52-tone RU 14 + 26-tone RU 30 |
| | MRU 11 | 52-tone RU 14 + 26-tone RU 33 |
| | MRU 12 | Not defined |
| 106 + 26-tone MRU | MRU 1 | 106-tone RU 1 + 26-tone RU 5 |
| | MRU 2 | Not defined |
| | MRU 3 | Not defined |
| | MRU 4 | 106-tone RU 4 + 26-tone RU 14 |
| | MRU 5 | 106-tone RU 5 + 26-tone RU 24 |
| | MRU 6 | Not defined |
| | MRU 7 | Not defined |
| | MRU 8 | 106-tone RU 8 + 26-tone RU 33 |

It can be observed from FIG. 7D to 7F that the allowed 106+26-tone MRUs in OFDMA 20 MHz EHT PPDU overlap in frequency domain, but not all the allowed 106+26-tone MRUs in OFDMA 40 MHz, 80 MHz, 160 MHz or 320 MHz EHT PPDU overlap in frequency domain. In some embodiments of the disclosure, a User Info field with the AID12 subfield set to the first value or the second value shall not be set to allocate more than one 106+26-tone MRU in a 20 MHz EHT TB PPDU and may be set to allocate a plurality of 106+26-tone MRUs which do not overlap in frequency domain in a 40 MHz, 80 MHz, 160 MHz or 320 MHz EHT TB PPDU. For example, referring to indices for small size MRUs in an OFDMA 80 MHz EHT PPDU as shown in Table 2, a User Info field with the AID12 subfield set to the first value or the second value may be set to allocate 106+26-tone MRU 1 and 106+26-tone MRU 4 for UORA in an 80 MHz EHT TB PPDU.

In some embodiments, a User Info field with the AID12 subfield set to the first value or the second value may be set to indicate a starting small-size RA-MRU and a count number N of small-size RA-MRUs allocated by the AP, where the count number N may be larger than 1. In a first embodiment, the allocated N small-size RA-MRUs may include the starting small size RA-MRU and (N–1) subsequent defined RA-MRUs after the starting RA-MRU, wherein each subsequent defined RA-MRU is separated by one defined RA-MRU from an adjacent allocated RA-MRU thereof. For one example, if a User Info field with the AID12 subfield set to the first value or the second value is set to allocate three 52+26-tone MRUs for UORA in an 80 MHz EHT TB PPDU with 52+26-tone MRU 3 as the starting RA-MRU, the allocated three 52+26-tone MRUs include 52+26-tone MRU 3, 52+26-tone MRU 5 and 52+26-tone MRU 9. For another example, if a User Info field with the AID12 subfield set to the first value or the second value is set to allocate three 52+26-tone MRUs for UORA in an 80 MHz EHT TB PPDU with 52+26-tone MRU 4 as the starting RA-MRU, the allocated three 52+26-tone MRUs include 52+26-tone MRU 4, 52+26-tone MRU 8 and 52+26-tone MRU 10. In this example, 52+26-tone MRUs 6 and 7 are not defined as shown in Table 2.

Alternatively, in a second embodiment, the allocated N small-size RA-MRUs may include the starting RA-MRU and (N–1) RA-MRUs subsequent defined RA-MRUs immediately after the starting RA-MRU, excluding any RA-MRU which overlaps with its preceding RA-MRU. For one example, if a User Info field with the AID12 subfield set to the first value or the second value is set to allocate three 52+26-tone MRUs for UORA in an 80 MHz EHT TB PPDU with 52+26-tone MRU 3 as the starting RA-MRU, the allocated three 52+26-tone MRUs include 52+26-tone MRU 3, 52+26-tone MRU 4 and 52+26-tone MRU 8. For another example, if a User Info field with the AID12 subfield set to the first value or the second value is set to allocate three 52+26-tone MRUs for UORA in an 80 MHz EHT TB PPDU with 52+26-tone MRU 4 as the starting RA-MRU, the allocated three 52+26-tone MRUs include 52+26-tone MRU 4, 52+26-tone MRU 8 and 52+26-tone MRU 9. As shown in Table 2, in this example, 52+26-tone MRU 5 shares 52-tone RU 6 with 52+26-tone MRU 4 and 52+26-tone MRUs 6 and 7 are not defined.

According to various embodiments of the disclosure, an HE variant User Info field with an AID12 subfield set to the first value or the second value may be set to allocate one or more contiguous RA-RUs within P160 in a 320 MHz TB A-PPDU. An EHT variant User Info field with the AID12 subfield set to the first value or the second value may be set to allocate one or more RA-RUs or RA-MRUs within either P160 or S160 in a 320 MHz TB A-PPDU. In other words, one or more RA-RUs or RA-MRUs in a 320 MHz TB A-PPDU allocated by an EHT variant User Info field with the AID12 subfield set to the first value or the second value do not cross the boundary between P160 and S160. On the other hand, an EHT variant User Info field with the AID12 subfield set to the first value or the second value may be set to allocate one or more RA-RUs or RA-MRUs in a 320 MHz EHT TB PPDU that cross the boundary between P160 and S160.

Figures 8B, 8C, 8D:
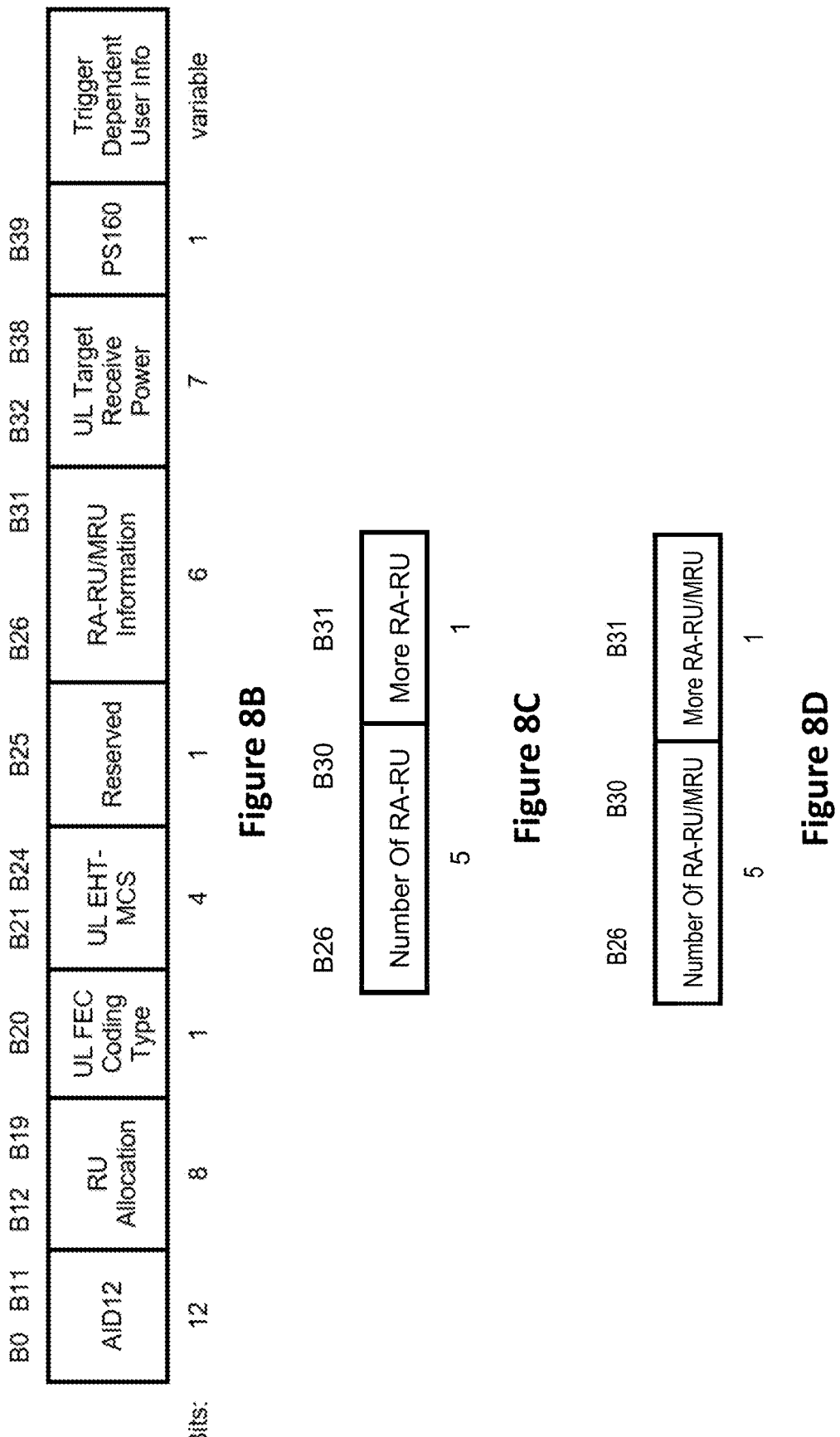
FIG. 8B is a block diagram illustrating a format of an EHT variant User Info field according to some embodiments of the disclosure.
FIG. 8C is a block diagram illustrating a format of the RA-RU Information field of the HE variant User Info field as shown in FIG. 8A.
FIG. 8D is a block diagram illustrating a format of the RA-RU/MRU Information field of the EHT variant User Info field as shown in FIG. 8B.

FIG. 8A is a block diagram illustrating a format of an HE variant User Info field according to some embodiments of the disclosure. FIG. 8B is a block diagram illustrating a format of an EHT variant User Info field according to some embodiments of the disclosure. The AID12 subfield of the HE variant User Info field or the EHT variant User Info field may be set to the first value if the one or more RA-RUs or RA-MRUs are allocated for associated STAs, or the second value if the one or more RA-RUs or RA-MRUs are allocated for unassociated STAs. As shown in FIGS. 8A and 8B, the B25 in an EHT variant User Info field is reserved and may be set to 0 to indicate that this is an EHT variant User Info field, while the B25 in an HE variant User Info field is the UL DCM subfield. The B39 in an HE variant User Info field is reserved and may be set to 0 to indicate that this is an HE variant User Info field, while the B39 in an EHT variant User Info field is a PS160 subfield. In one example, the User Info field with the AID12 subfield set to the first value or the second value is an HE variant if the B39 of the User Info field is set to 0 and the HE/EHT P160 subfield of the Common Info field is set to 1 in the Trigger frame; otherwise, it is an EHT variant.

As shown in FIG. 8A, an HE variant User Info field with the AID12 subfield set to the first value or the second value may include an RU Allocation subfield and an RA-RU Information field. The RU Allocation subfield may be set to indicate the starting RU of the one or more contiguous RA-RUs allocated by the HE variant User Info field. FIG. 8C is a block diagram illustrating a format of the RA-RU Information field of the HE variant User Info field as shown in FIG. 8A. The RA-RU Information field may further include a Number Of RA-RU subfield, i.e., the first subfield, which is set to indicate the count number of contiguous RUs allocated for UORA. In one example, the value of the Number Of RA-RU subfield may be set to the count number of RA-RUs minus 1.

As shown in FIG. 8B, an EHT variant User Info field with the AID12 subfield set to the first value or the second value may include an RU Allocation subfield and an RA-RU/MRU Information field. For the EHT variant User Info field with the AID12 subfield set to the first value or the second value, the RU Allocation subfield, i.e., the second subfield, and a PS160 subfield, i.e., the second subfield, may be set to indicate the starting RU of one or more RA-RUs or the starting MRU of one or more RA-MRUs allocated by the EHT variant User Info field. FIG. 8D is a block diagram illustrating a format of the RA-RU/MRU Information field of the EHT variant User Info field as shown in FIG. 8B. The RA-RU/MRU Information field may further include a Number Of RA-RU/MRU subfield, i.e., the first subfield, which is set to indicate the count number of RUs or MRUs allocated for UORA. In one example, the value of the Number Of RA-RU/MRU subfield may be set to the count number of RA-RUs or RA-MRUs minus 1. It should be noted that the names and order of the subfields in the User Info fields as shown in FIGS. 8A-8D are only for illustration purpose, not to limit the scope of the disclosure. In other embodiments, the names and order of the subfields may be different.

Figure 9:
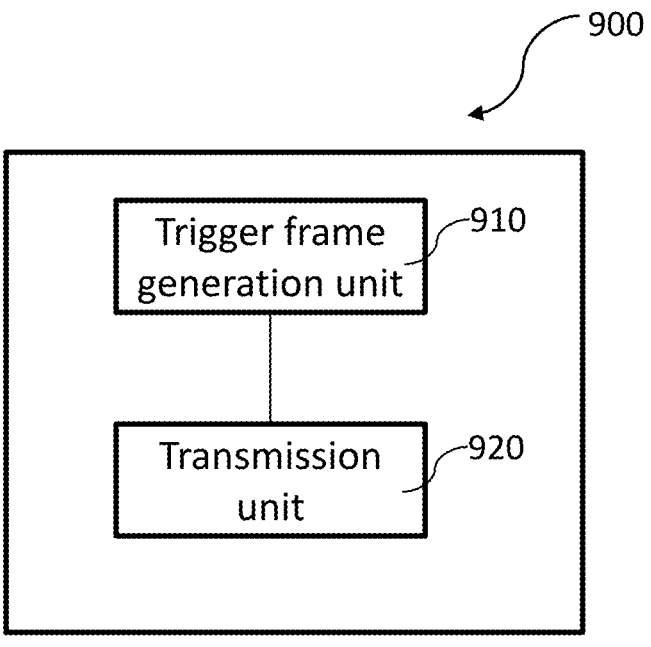
FIG. 9 is a schematic diagram illustrating an AP according to some embodiments of the disclosure.

Various embodiments of the disclosure also provide an AP for random access in a WLAN. FIG. 9 is a schematic diagram illustrating an AP 900 according to some embodiments of the disclosure. Referring to FIG. 9, the AP 900 may include a trigger frame generation unit 910 configured to set a User Info field in a Trigger frame to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs, and a transmission unit 920 configured to send the Trigger frame to the associated STAs and/or the unassociated STAs.

In some embodiments, the trigger frame generation unit 910 may be configured to set the AID12 subfield of the User Info field to the first value if one or more contiguous RUs are allocated for UORA for associated HE STAs, or the second value if one or more contiguous RUs are allocated for UORA for unassociated HE STAs. In one embodiment, the first value may be 0 and the second value may be 2045.

In some embodiments, the trigger frame generation unit 910 may be configured to set the AID 12 subfield of the User Info field to the first value in [1, 2006], [2008, 2044] or [2047, 4094] if the one or more RUs or MRUs are allocated for UORA for the associated STAs which are EHT STAs, or the second value in [1, 2006], [2008, 2044] or [2047, 4094] if the one or more RUs or MRUs are allocated for UORA for the unassociated STAs which are EHT STAs.

In some embodiments, the trigger frame generation unit 910 may be further configured to set the User Info field to allocate a plurality of RUs or MRUs for UORA for the associated STAs or unassociated STAs, wherein each of the plurality of RUs or MRUs has a same size.

In some embodiments, the trigger frame generation unit 910 may be further configured to set the User Info field to allocate a plurality of RUs for UORA for the associated STAs or unassociated STAs, wherein the plurality of RUs are defined and contiguous. The "contiguous" means that the RU indices of the plurality of allocated defined RUs are contiguous excluding any RU index of any undefined RU if any.

In some embodiments, the trigger frame generation unit 910 may be further configured to set the User Info field to allocate a plurality of MRUs for UORA for the associated STAs or unassociated STAs, the plurality of MRUs are defined and not contiguous. The "not contiguous" means that the MRU indices of the plurality of defined MRUs are not contiguous.

In some embodiments, the trigger frame generation unit 910 may be further configured to set the User Info field to allocate the plurality of MRUs which do not overlap in frequency domain and belong to different 80 MHz subblocks if the plurality of MRUs are 484+242-tone MRUs and the TB PPDU has a bandwidth of 160 MHz or 320 MHz.

In some embodiments, the trigger frame generation unit 910 may be further configured to set the User Info field to indicate a starting RU or MRU of the one or more allocated RUs or MRUs and a count number N of the allocated one or more RUs or MRUs.

It should be noted that in the description, the "allocated one or more RUs or MRUs" refer to the one or more allocated RA-RUs or RA-MRUs, and the starting RU or MRU refers to the starting RA-RU or RA-MRU, of the allocated RA-RUs or RA-MRUs.

In some embodiments, the trigger frame generation unit 910 may be further configured to set a first subfield, e.g., Number Of RA-RU/MRU, of the User Info field to indicate that the count number N of the allocated MRUs. The count number N is 1 if each allocated MRU is a 106+26-tone MRU and the TB PPDU has a bandwidth of 20 MHz, or if each allocated MRU is a 484+242-tone MRU and the TB PPDU has a bandwidth of 80 MHz, or if each allocated MRU is a 996+484-tone MRU and the TB PPDU has a bandwidth of 160 MHz or 320 MHz; or if each allocated MRU is a 2×996+484-tone MRU, 3×996-tone MRU or 3×996+484-tone MRU and the TB PPDU has a bandwidth of 320 MHz.

In some embodiments, the trigger frame generation unit 910 may be further configured to set a second subfield, e.g., the RU Allocation subfield, and a third subfield e.g., the PS160 subfield, of the User Info field to indicate a starting RU or MRU of the one or more allocated RUs or MRUs.

In some embodiments, if the starting RU or MRU is a 484+242-tone MRU, the trigger frame generation unit 910 may be further configured to set the User Info field to allocate N MRUs for UORA for the associated or unassociated STAs, wherein N is an integer greater than 1 and the N allocated MRUs comprise the starting MRU and N−1 subsequent MRUs after the starting MRU, each subsequent MRU is separated by three MRUs from an adjacent allocated MRU thereof, i.e., the adjacent allocated MRU of each subsequent MRU.

In some embodiments, if the starting RU or MRU is an MRU with a size smaller than 242 tones, the trigger frame generation unit 910 may be further configured to set the User Info field to allocate N MRUs for UORA for the associated or unassociated STAs, wherein N is an integer greater than 1 and the N allocated MRUs comprise the starting MRU and N−1 subsequent defined MRUs after the starting MRU, wherein each subsequent defined MRU is separated by one defined MRU from an adjacent allocated MRU thereof, i.e., the adjacent allocated MRU of each subsequent defined MRU.

Alternatively, in some embodiments, if the starting RU or MRU is an MRU with a size smaller than 242 tones, the trigger frame generation unit 910 may be further configured to set the User Info field to allocate N MRUs for UORA for the associated or unassociated STAs, wherein N is an integer greater than 1 and the N allocated MRUs comprise the starting MRU and (N−1) subsequent defined MRUs immediately after the starting MRU excluding any MRU that overlaps with its preceding MRU.

In some embodiments, the trigger frame generation unit 910 may be further configured to set the User Info field to allocate the one or more RUs or MRUs within P160 or S160 if the TB PPDU is a 320 MHz TB A-PPDU.

Figure 10:
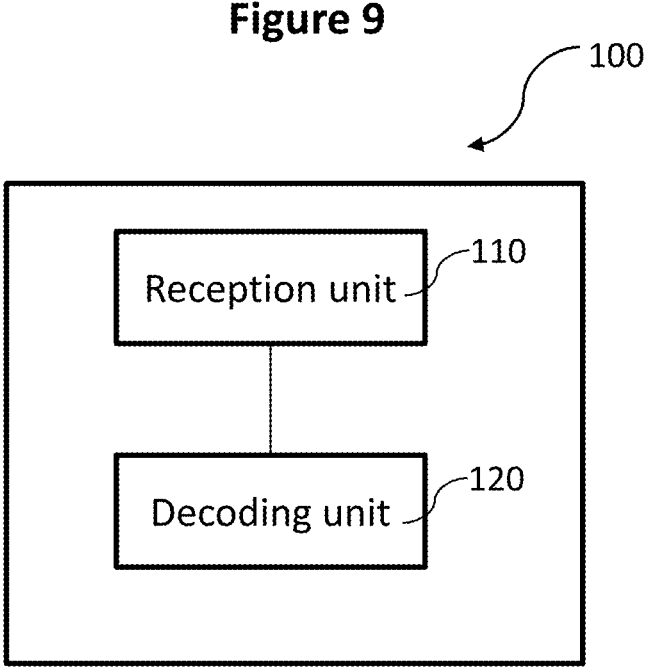
FIG. 10 is a schematic diagram illustrating an STA according to some embodiments of the disclosure.

Various embodiments of the disclosure also provide an STA for SST operation in a WLAN. FIG. 10 is a schematic diagram illustrating an STA 100 according to some embodiments of the disclosure. Referring to FIG. 10, the STA 100 may include a reception unit 110 configured to receive a Trigger frame from an AP, wherein a User Info field in the Trigger frame is set to allocate one or more RUs or MRUs in a TB PPDU for UORA for associated STAs or unassociated STAs, wherein an AID12 subfield of the User Info field is set to a first value if the one or more RUs or MRUs are allocated for UORA for the associated STAs, or a second value different from the first value if the one or more RUs or MRUs are allocated for UORA for the unassociated STAs, wherein the STA is one of the associated STAs or the unassociated STAs, and a decoding unit 120 configured to decode the received trigger frame to determine the one or more RUs or MRUs allocated for UORA for the associated STAs and/or the unassociated STA.

In some embodiments, the AID12 subfield of the User Info field may be set to the first value if one or more contiguous RUs are allocated for UORA for associated HE STAs, or the second value if one or more contiguous RUs are allocated for UORA for unassociated HE STAs. In one embodiment, the first value may be 0 and the second value may be 2045.

In some embodiments, the AID12 subfield may be set to the first value in [1, 2006], [2008, 2044] or [2047, 4094] if the one or more RUs or MRUs are allocated for UORA for the associated STAs which are EHT STAs, or the AID12 subfield is set to the second value in [1, 2006], [2008, 2044] or [2047, 4094] if the one or more RUs or MRUs are allocated for UORA for the unassociated STAs which are EHT STAs.

In some embodiments, if the User Info field is set to allocate a plurality of RUs or MRUs for UORA for the associated STAs or unassociated STAs, each of the plurality of RUs or MRUs may have a same size.

In some embodiments, if the User Info field is set to allocate a plurality of RUs for UORA for the associated STAs or unassociated STAs, the plurality of RUs are defined and contiguous.

In some embodiments, if the User Info field is set to allocate a plurality of MRUs for UORA for the associated STAs or unassociated STAs, the plurality of MRUs are defined and may not be contiguous.

In some embodiments, if the plurality of allocated MRUs are 484+242-tone MRUs and the TB PPDU has a bandwidth of 160 MHz or 320 MHz, the plurality of allocated MRUs do not overlap in frequency domain and belong to different 80 MHz subblocks.

In some embodiments, the User Info field may be set to indicate a starting RU or MRU of the one or more allocated RUs or MRUs for UORA and a count number N of the allocated one or more RUs or MRUs for UORA.

In some embodiments, a first subfield, e.g., the Number Of RA-RU/MRU subfield, of the User Info field may be set to indicate that the count number N of the allocated MRUs.

The count number N is 1 if each allocated MRU is a 106+26-tone MRU and the TB PPDU has a bandwidth of 20 MHz, or if each allocated MRU is a 484+242-tone MRU and the TB PPDU has a bandwidth of 80 MHz, or if each allocated MRU is a 996+484-tone MRU and the TB PPDU has a bandwidth of 160 MHz or 320 MHz; or if each allocated MRU is a 2×996+484-tone MRU, 3×996-tone MRU or 3×996+484-tone MRU and the TB PPDU has a bandwidth of 320 MHz.

In some embodiments, a second subfield, e.g., the RU Allocation subfield, and a third subfield, e.g., the PS160 subfield, of the User Info field may be set to indicate a starting RU or MRU of the one or more allocated RUs or MRUs.

In some embodiments, if the starting RU or MRU is a 484+242-tone MRU, the User Info field may be set to allocate N MRUs for UORA for the associated or unassociated STAs, wherein N may be an integer greater than 1 and the N allocated MRUs may include the starting MRU and N−1 subsequent MRUs after the starting MRU, each subsequent MRU is separated by three MRUs from an adjacent allocated MRU thereof.

In some embodiments, if the starting RU or MRU is an MRU with a size smaller than 242 tones, the User Info field may be set to allocate N MRUs for UORA for the associated or unassociated STAs, wherein N may be an integer greater than 1 and the N allocated MRUs may include the starting MRU and N−1 subsequent defined MRUs after the starting MRU, wherein each subsequent defined MRU is separated by one defined MRU from an adjacent allocated MRU thereof.

Alternatively, in some embodiments, if the starting RU or MRU is an MRU with a size smaller than 242 tones, the User Info field may be set to allocate N MRUs for UORA for the associated or unassociated STAs, wherein N may be an integer greater than 1 and the N allocated MRUs may include the starting MRU and (N−1) subsequent defined MRUs immediately after the starting MRU excluding any MRU that overlaps with its preceding MRU.

In some embodiments, the User Info filed may be an EHT variant User Info field which is set to allocate the one or more RUs or MRUs within P160 or S160 if the TB PPDU is a 320 MHz TB A-PPDU.

Various embodiments of the disclosure also provide an AP for random access in a WLAN. The AP may include a memory to store instructions for performing the first method for random access in the WLAN, and a processor communicably coupled with the memory, the processor configured to execute the instructions to perform the first method for random access in a WLAN as described in various embodiments of the disclosure.

Various embodiments of the disclosure also provide an STA for random access in a WLAN. The STA may include a memory to store instructions for performing the second method for random access in the WLAN, and a processor communicably coupled with the memory, the processor configured to execute the instructions to perform the second method for random access in a WLAN as described in various embodiments of the disclosure.

Various embodiments of the disclosure also provide a computer program product comprising instructions to cause a computer to perform any method for random access in a WLAN according to any embodiment of the disclosure, when executed thereon.

Various embodiments of the disclosure also provide a computer program comprising instructions to cause a computer to perform a method for random access in a WLAN according to any embodiment of the disclosure, when executed thereon.

Various embodiments of the disclosure also provide a non-volatile storage medium comprising computer program codes to cause a computer to perform a method for random access in a WLAN according to any embodiment of the disclosure, when executed thereon.

Various embodiments of the disclosure also provide a chip configured to perform a method for random access in a WLAN according to any embodiment of the disclosure.

At least some steps of the methods for random access in a WLAN according to any embodiments of the disclosure described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media.

As described above, in various embodiments of the disclosure, an AID 12 subfield of a User Info field of a trigger frame is set to different values to indicate whether the one or more RA-RUs or RA-MRUs allocated by the User Info field are for associated STAs or unassociated STAs. Further, the number of the allocated RA-MRUs is limited to 1 under some specific scenarios to avoid collision among data transmission. Also, a starting RU or MRU and a count number of the allocated RA-RUs or RA-MRUs are indicated in the User Info field so that the random access recourse allocation can be performed efficiently and effectively. In conclusion, various embodiments of the disclosure provide an efficient and effective solution for random access in a WLAN. With the solution proposed in embodiments of the disclosure, the system throughput in a WLAN can be significantly improved.

It is to be understood that the embodiments and features described above should be considered exemplary and not restrictive. Many other embodiments will be apparent to those skilled in the art from consideration of the specification and practice of the disclosure. The scope of the disclosure should, therefore, be determined with reference to the appended claims, along with the full scope of equivalents to which such claims are entitled. Furthermore, certain terminology has been used for the purposes of descriptive clarity, and not to limit the disclosed embodiments of the disclosure.

The invention claimed is:

1. A method for random access in a wireless local area network (WLAN), the method comprising:
    setting, by an access point (AP), a User Info field in a Trigger frame to allocate one or more resource units (RUs) or multiple resource units (MRUs) in a trigger-based (TB) physical layer protocol data unit (PPDU) for uplink orthogonal frequency division multiple access based random access (UORA) for associated stations (STAs) or unassociated STAs, wherein an association identifier (AID)12 subfield of the User Info field is set to a first value if the one or more RUs or MRUs are allocated for UORA for the associated STAs, or a second value different from the first value if the one or more RUs or MRUs are allocated for UORA for the unassociated STAs, and
    sending, by the AP, the Trigger frame to the associated STAs and/or the unassociated STAs;
    wherein setting the User Info field comprises:
    setting, by the AP, the User Info field to indicate a starting RU or MRU of the one or more allocated RUs or MRUs and a count number N of the allocated one or more RUs or MRUs,
    if the starting RU or MRU is a 484+242-tone MRU, setting, by the AP, the User Info field to allocate N MRUs for UORA for the associated or unassociated STAs, wherein N is an integer greater than 1 and the N allocated MRUs comprise the starting MRU and N−1 subsequent MRUs after the starting MRU, each subsequent MRU is separated by three MRUs from an adjacent allocated MRU thereof.

2. The method according to claim 1, wherein the AID12 subfield is set to the first value in [1, 2006], [2008, 2044] or [2047, 4094] if the one or more RUs or MRUs are allocated for UORA for the associated STAs which are extremely high throughput (EHT) STAs, or the AID12 subfield is set to the second value in [1, 2006], [2008, 2044] or [2047, 4094] if the one or more RUs or MRUs for UORA are allocated for the unassociated STAs which are EHT STAs.

3. The method according to claim 1, wherein the setting the User Info field further comprises: setting, by the AP, a first subfield of the User Info field to indicate that the count number N of the allocated MRUs, wherein the count number N is 1 if each allocated MRU is a 106+26-tone MRU and the TB PPDU has a bandwidth of 20 MHz, or if each allocated MRU is a 484+242-tone MRU and the TB PPDU has a bandwidth of 80 MHz, or if each allocated MRU is a 996+484-tone MRU and the TB PPDU has a bandwidth of 160 MHz or 320 MHz; or if each allocated MRU is a 2×996+484-tone MRU, 3×996-tone MRU or 3×996+484-tone MRU and the TB PPDU has a bandwidth of 320 MHz.

4. The method according to claim 1, wherein the setting the User Info field further comprises: setting, by the AP, the User Info field to allocate the one or more RUs or MRUs within a primary 160 MHz channel (P160) or a secondary 160 MHz channel (S160) if the TB PPDU is a 320 MHz TB frequency domain aggregated PPDU (A-PPDU).

5. An access point (AP) for random access in a wireless local area network (WLAN), the AP comprising:
    a processor configured to set a User Info field in a Trigger frame to allocate one or more resource units (RUs) or multiple resource units (MRUs) in a trigger-based (TB) physical layer protocol data unit (PPDU) for uplink orthogonal frequency division multiple access based random access (UORA) for associated stations (STAs) or unassociated STAs, wherein an association identifier (AID)12 subfield of the User Info field is set to a first value if the one or more RUs or MRUs are allocated for UORA for the associated STAs, or a second value different from the first value if the one or more RUs or MRUs are allocated for UORA for the unassociated STAs, and
    a transceiver configured to send the Trigger frame to the associated STAs and/or the unassociated STAS;
    wherein the processor is further configured to set the User Info field to indicate a starting RU or MRU of the one or more allocated RUs or MRUs and a count number N of the allocated one or more RUs or MRUs, and
    wherein if the starting RU or MRU is a 484+242-tone MRU, the processor is further configured to set the User Info field to allocate N MRUs for UORA for the associated or unassociated STAs, wherein N is an integer greater than 1 and the N allocated MRUs comprise the starting MRU and N–1 subsequent MRUs after the starting MRU, each subsequent MRU is separated by three MRUs from an adjacent allocated MRU thereof.

6. The AP according to claim 5, wherein the processor is configured to set the AID12 subfield to the first value in [1, 2006], [2008, 2044] or [2047, 4094] if the one or more RUs or MRUs are allocated for UORA for the associated STAs which are EHT STAs, or the second value in [1, 2006], [2008, 2044] or [2047, 4094] if the one or more RUs or MRUs are allocated for UORA for the unassociated STAs which are EHT STAs.

7. The AP according to claim 5, wherein the processor is further configured to set the User Info field to allocate a plurality of RUs or MRUs for UORA for the associated STAs or unassociated STAs, wherein each of the plurality of RUs or MRUs has a same size.

8. The AP according to claim 7, wherein the processor is further configured to set the User Info field to allocate a plurality of RUs for UORA for the associated STAs or unassociated STAs, wherein the plurality of RUs are defined and contiguous.

9. The AP according to claim 7, wherein the processor is further configured to set the User Info field to allocate a plurality of MRUs for UORA for the associated STAs or unassociated STAs, the plurality of MRUs are defined and not contiguous.

10. The AP according to claim 9, wherein the processor is further configured to set the User Info field to allocate the plurality of MRUs which do not overlap in frequency domain and belong to different 80 MHz subblocks if the plurality of MRUs are 484+242-tone MRUs and the TB PPDU has a bandwidth of 160 MHz or 320 MHz.

11. The AP according to claim 5, wherein the processor is further configured to set a first subfield of the User Info field to indicate that the count number N of the allocated MRUs, wherein the count number N is 1 if each allocated MRU is a 106+26-tone MRU and the TB PPDU has a bandwidth of 20 MHz, or if each allocated MRU is a 484+242-tone MRU and the TB PPDU has a bandwidth of 80 MHz, or if each allocated RA-MRU is a 996+484-tone MRU and the TB PPDU has a bandwidth of 160 MHz or 320 MHz; or if each allocated RA-MRU is a 2×996+484-tone MRU, 3×996-tone MRU or 3×996+484-tone MRU and the TB PPDU has a bandwidth of 320 MHz.

12. The AP according to claim 5, wherein the processor is further configured to set a second subfield and a third subfield of the User Info field to indicate the starting RU or MRU of the one or more allocated RUs or MRUs.

13. The AP according to claim 12, wherein if the starting RU or MRU is an MRU with a size smaller than 242 tones, the processor is further configured to set the User Info field to allocate N MRUs for UORA for the associated or unassociated STAs, wherein the N allocated MRUs comprise the starting MRU and N–1 subsequent defined MRUs after the starting MRU, wherein each subsequent defined MRU is separated by one defined MRU from an adjacent allocated MRU thereof.

14. The AP according to claim 12, wherein if the starting RU or MRU is an MRU with a size smaller than 242 tones, the processor is further configured to set the User Info field to allocate N MRUs for UORA for the associated or unassociated STAs, wherein the N allocated MRUs comprise the starting MRU and (N–1) subsequent defined MRUs immediately after the starting MRU excluding any MRU that overlaps with its preceding MRU.

15. The AP according to claim 5, wherein the processor is further configured to set the User Info field to allocate the one or more RUs or MRUs within a primary 160 MHz channel (P160) or a secondary 160 MHz channel (S160) if the TB PPDU is a 320 MHz TB frequency domain aggregated PPDU (A-PPDU).

16. A station (STA) for random access in a wireless local area network (WLAN), the STA comprising:
a transceiver configured to receive a Trigger frame from an access point (AP), wherein a User Info field in the Trigger frame is set to allocate one or more resource units (RUS) or multiple resource units (MRUs) in a trigger-based (TB) physical layer protocol data unit (PPDU) for uplink orthogonal frequency division multiple access based random access (UORA) for associated stations (STAs) STAs or unassociated STAs, wherein an association identifier (AID)12 subfield of the User Info field is set to a first value if the one or more RUs or MRUs are allocated for UORA for the associated STAs, or a second value different from the first value if the one or more RUs or MRUs are allocated for UORA for the unassociated STAs, wherein the STA is one of the associated STAs or the unassociated STAs, and
a processor configured to decode the received Trigger frame to determine the one or more RUs or MRUs allocated for UORA for the associated STAs and/or the unassociated STAs;
wherein the User Info field is set to indicate a starting RU or MRU of the one or more allocated RUs or MRUs and a count number N of the allocated one or more RUs or MRUs, and
wherein if the starting RU or MRU is a 484+242-tone MRU, the User Info field is set to allocate N MRUs for UORA for the associated or unassociated STAs, wherein N is an integer greater than 1 and the N allocated MRUs comprise the starting MRU and N–1 subsequent MRUs after the starting MRU, each subsequent MRU is separated by three MRUs from an adjacent allocated MRU thereof.

17. The STA according to claim 16, wherein the AID12 subfield is set to the first value in [1, 2006], [2008, 2044] or [2047, 4094] if the one or more RUs or MRUs are allocated for UORA for the associated STAs which are EHT STAs, or the AID12 subfield is set to the second value in [1, 2006], [2008, 2044] or [2047, 4094] if the one or more RUs or MRUs are allocated for UORA for the unassociated STAs which are EHT STAs.

18. The STA according to claim 16, wherein the User Info filed is set to allocate the one or more RUs or MRUs within a primary 160 MHz channel (P160) or a secondary 160 MHz channel (S160) if the TB PPDU is a 320 MHz TB frequency domain aggregated PPDU (A-PPDU).

* * * * *